United States Patent [19]
Stevens

[11] Patent Number: 6,145,088
[45] Date of Patent: Nov. 7, 2000

[54] APPARATUS AND METHOD FOR REMOTE DATA RECOVERY

[75] Inventor: Gary Scott Stevens, Chanhassen, Minn.

[73] Assignee: Ontrack Data International, Inc., Eden Prairie, Minn.

[21] Appl. No.: 08/877,125

[22] Filed: Jun. 17, 1997

Related U.S. Application Data

[63] Continuation-in-part of application No. 08/667,956, Jun. 18, 1996, abandoned.

[51] Int. Cl.[7] .................................................... G06F 11/00
[52] U.S. Cl. .................................................. 714/2; 714/25
[58] Field of Search ............................. 714/2, 4, 25, 27; 370/216, 220, 228, 241

[56] References Cited

U.S. PATENT DOCUMENTS

| | | | |
|---|---|---|---|
| 4,463,418 | 7/1984 | O'Quin, II et al. | 714/2 |
| 4,823,343 | 4/1989 | Takahashi . | |
| 5,133,065 | 7/1992 | Cheffetz et al. | 714/2 |
| 5,367,667 | 11/1994 | Wahlquist et al. . | |
| 5,388,252 | 2/1995 | Dreste et al. . | |
| 5,412,801 | 5/1995 | De Remer et al. | 714/20 |
| 5,455,933 | 10/1995 | Schieve et al. | 714/27 |
| 5,577,210 | 11/1996 | Abdous et al. . | |
| 5,586,247 | 12/1996 | Yoshifuji et al. | 714/2 |
| 5,594,900 | 1/1997 | Cohn et al. . | |
| 5,615,330 | 3/1997 | Taylor . | |
| 5,673,382 | 9/1997 | Cannon et al. | 714/6 |
| 5,727,142 | 3/1998 | Chen | 714/2 |

FOREIGN PATENT DOCUMENTS

| | | |
|---|---|---|
| 0 333 620 A2 | 9/1989 | European Pat. Off. . |
| WO 95/19595 | 7/1995 | WIPO . |

OTHER PUBLICATIONS

"Low–Cost Remote Diagnostics of Computing Devices", *IBM Technical Disclosure Bulletin*, 31(1):407–410 (Jun. 1988).

"PC checkt PC", *Nachrichten Elektronik und Telematik*, 40(Spec. 2):45–46 (Oct. 1986).

*Primary Examiner*—Robert W. Beausoliel, Jr.
*Assistant Examiner*—Pierre E. Elisca
*Attorney, Agent, or Firm*—Merchant & Gould P.C.

[57] ABSTRACT

Disclosed are an apparatus and a method for remote recovery of inaccessible data on computer storage devices. The method comprises the steps of (1) establishing a communications link from the local computer containing the storage device requiring recovery of data to a remote data recovery computer operated by a technician; (2) allowing the remote technician to interact as though seated in front of the local computer yet having access to all software programs which are resident at the technician's computer, and (3) enabling the remote technician to diagnose and rectify the data loss.

71 Claims, 28 Drawing Sheets

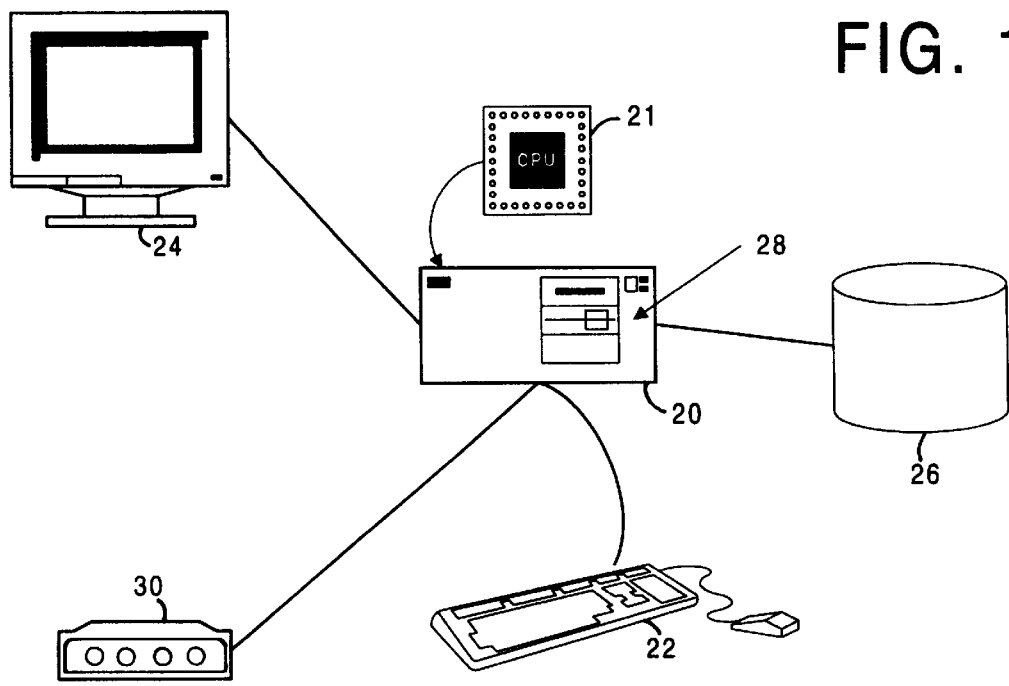
FIG. 1
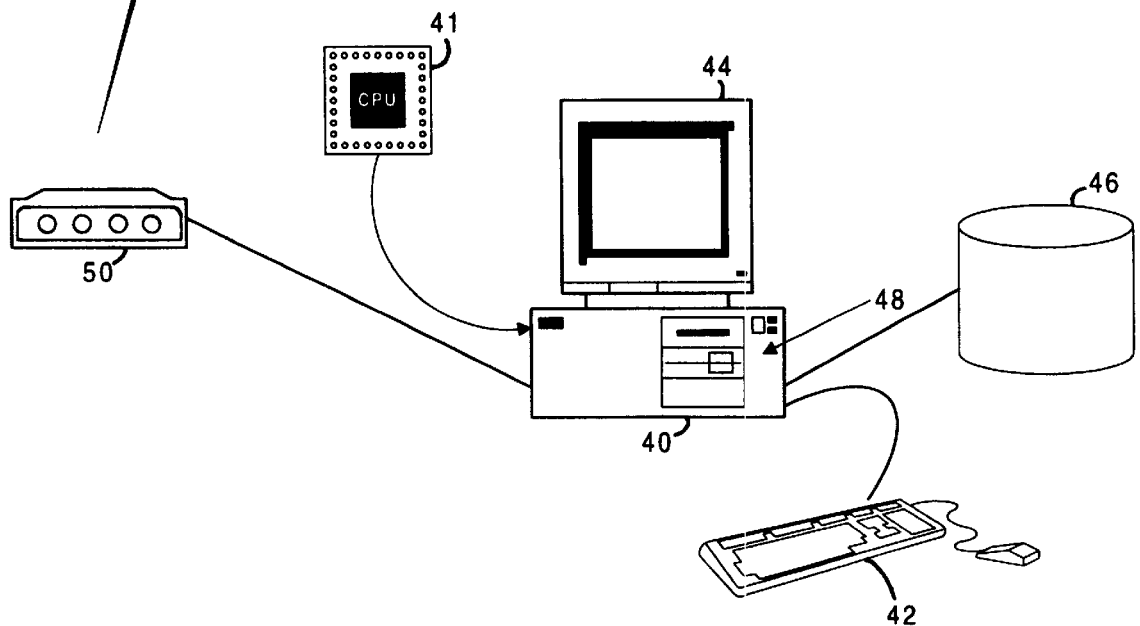
Typical Local Site
Typical Simple Remote Data Recovery Facility

Please enter your Personal Information:

| First Name | | Last Name | |

Address

Address

City                                State        ZipCode

Telephone              DataPhone              Fax

⌐2220

Please describe the circumstances of the data loss:

Please Check all boxes which describe the current situation:
- ○ Desired Files are damaged
- ○ Desired Files are missing
- ○ Files were Inadvertently Deleted
- ○ Operating System does not boot
- ○ Software Problem (describe below)
- ○ Other (describe below)

Most Important Files to Recover
○ All Possible

Describe Any Recovery Attempts Made

Any Other Relevant Comments

FIG. 23

Modem Status — 2310

| COMM CHANNEL | STATUS |
|---|---|
| COMM 1 | WAITING FOR A CALL |
| COMM 2 | WAITING FOR A CALL |
| COMM 3 | GUEST MODE |
| COMM 4 | GUEST MODE |
| COMM 5 | NEW USER MODE |
| COMM 6 | ACTIVE DATA RECOVERY |
| COMM 7 | OFF-LINE |
| COMM 8 | OFF-LINE |

WorkStation Status — 2320

| WorkStation IP | STATUS |
|---|---|
| 123.45.67.01 | Active Session-COMM6 |
| 123.45.67.02 | Waiting for Start Session |
| 123.45.67.03 | Waiting for Start Session |
| 123.45.67.04 | Waiting for Start Session |
| 123.45.67.05 | Waiting for Start Session |
| 123.45.67.06 | Waiting for Start Session |
| 123.45.67.07 | Waiting for Start Session |

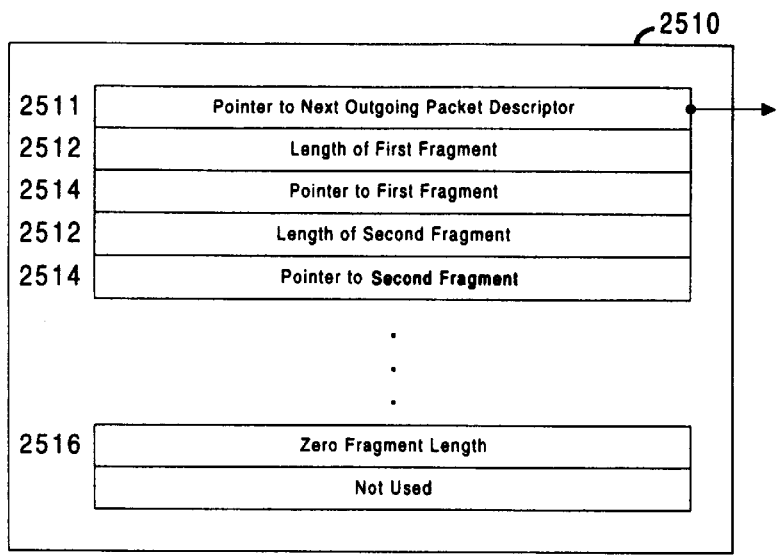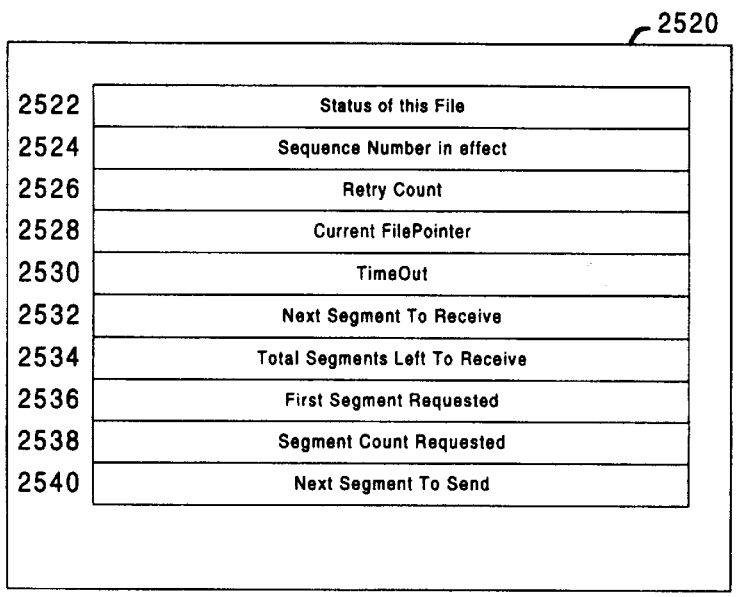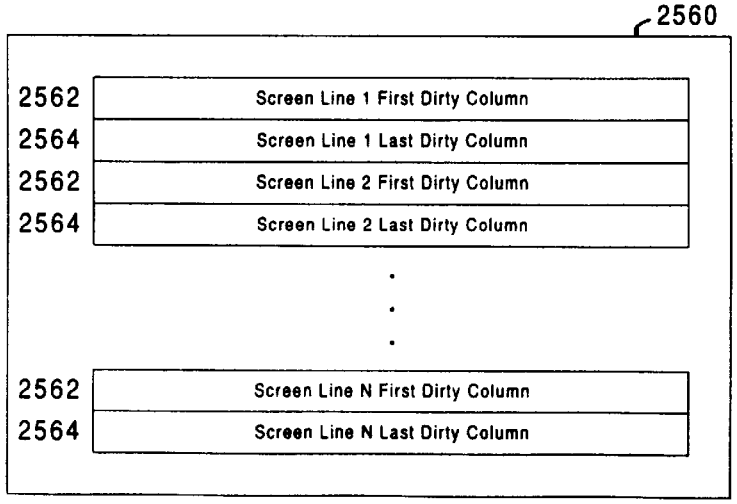
FIG. 25

FIG. 26
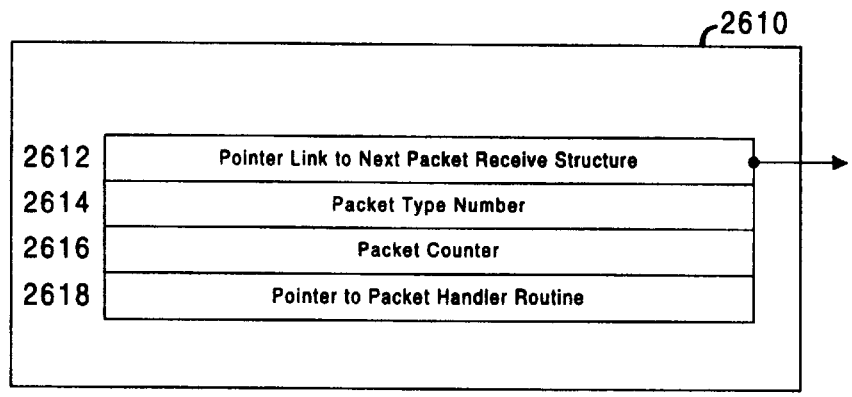
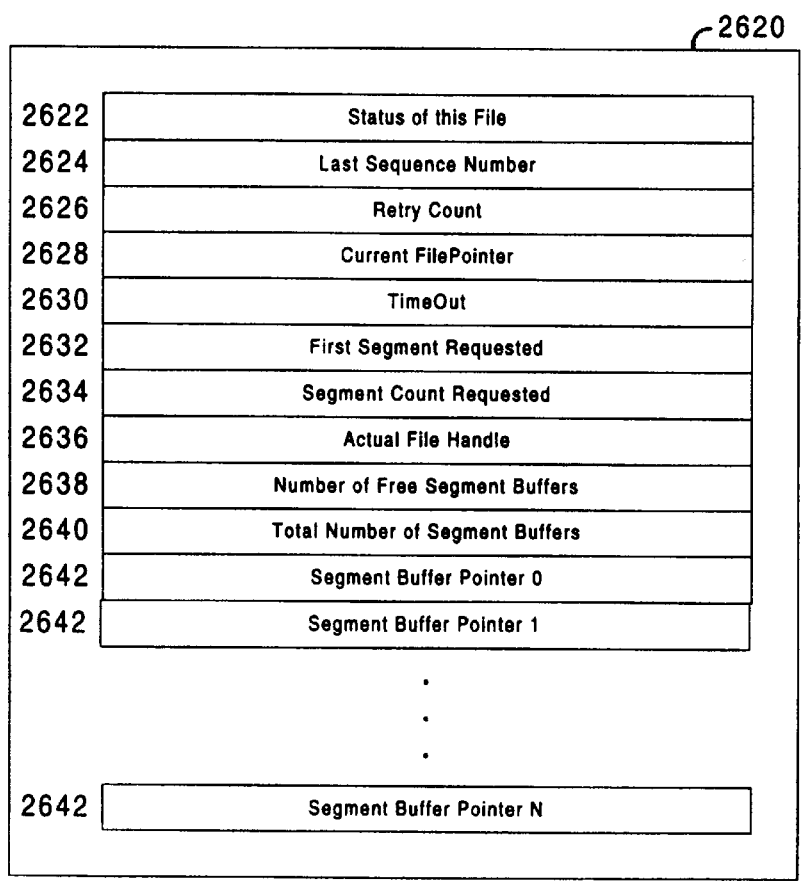

APPARATUS AND METHOD FOR REMOTE DATA RECOVERY

This application is a continuation-in-part of Ser. No. 08/667,956 filed Jun. 18, 1996, abandoned.

TECHNICAL FIELD OF THE INVENTION

The present invention relates, in general, to the recovery of information from computer data storage devices and/or media and, in particular, to the recovery of information which is inaccessible by the normal operating environment and to a method for allowing remote diagnosis and remote rectification of such data loss.

BACKGROUND OF THE INVENTION

The true value of a computing system to a user is not limited to the actual cost of the hardware and software components which comprise that system, but also includes the value of the data represented within that system. Indeed, it is quite common that the accounting data, intellectual property, design and manufacturing information, and/or other records which are stored on computing systems in personal and business use are ultimately of a value which far exceeds the value of the computing equipment itself.

Loss of the ability to access data on a computer storage device, such as a disk drive, can occur, often as a result of operator error, errant software, transient electrical events, acts of sabotage, or electrical/ mechanical failures. In many cases, although the data is not accessible by the normal operating environment, the data itself still exists on the storage media, and can be rendered accessible by manipulating the on-media data structures which represent the filesystem(s) employed by the operating environment. Such manipulation of on-media data structures is most reliably performed by trained technicians equipped with highly specialized software tools.

It is occasionally the case that the inaccessibility of data can be the cause of significant cost and/or lost business, sometimes to a catastrophic degree. While some forms of data may be candidates for recreation, the cost of this recreation may range from trivial to prohibitive. Additionally, data recreation takes a finite time, during which aspects of business may be necessarily suspended or hampered due to dependence upon the inaccessible data. There also exist categories of data which are generally acquired in real-time which are not able to be recreated, and which can therefore be considered as irreplaceable.

Traditional redundancy mechanisms, such as off-line backup, tend to provide relief for data loss situations. Restoration from off-line backup can, however, be time-consuming and may provide data which is aged with respect to the data which could potentially be available through data recovery procedures. Therefore, even data losses which are theoretically restorable from off-line backup may be considered as potential data recovery candidates.

Commercial data recovery service businesses address these issues with various categories of service. These typically include both on-site and off-site services. Off-site data recovery services, in which the media or device containing the inaccessible data is processed by a data recovery technician at a service facility, requires physical removal of the media or device from the customer premises and transportation to the service facility. This can cause significant down-time due to the delays induced by shipping. There also exist situations where the data is sensitive and corresponding security considerations dictate that removal of data from the site is not advisable. Many situations are sensitive even to the delays induced by the use of overnight carriers. On-site data recovery services, in which the data recovery technician and specialized equipment travel to the customer premises and perform the service locally, can reduce down-time, but at the added expense of transportation of the technician and the necessary equipment to and from the customer site.

There are remote control methods which allow a computer to be attached to a communications line via communications hardware so as to be controlled by an operator at a second computer, also attached to the communications line via communications hardware. Such hardware configurations are typical in personal computers, and such remote control software is readily available for common personal computer operating systems. Examples of such remote control programs include PCanywhere, Remote 2, Carbon Copy, etc. A drawback of this approach is that the computer being recovered must be running an operating system which supports 'he remote control software. Therefore, this approach is useless when the operating system does not support remote control.

A system and method for reliably allowing the remote recovery of data from computer storage media and devices by a remote technician is, therefore, an acute need in the art. The conventional prior art requires the computer storage media or device to be processed by a technician, either at the customer site or the technician's facility. Performance of data recovery services remotely, over a telephone link, has been successfully employed to overcome the shortcomings of on-site and off-site recovery, but requires that the target computer be able to load an operating system which supports the remote control software and allows access to the data which is desired to be recovered. Unfortunately, the circumstances leading to data loss can frequently also cause the normal operating system to be unstable or unusable. Accordingly, there is a particular need in the art for a method of providing remote data recovery capabilities even when the normal operating system is not necessarily loadable or dependable.

The present invention solves these problems and provides a method and apparatus for remote data recovery from computer data storage devices and/or media which is inaccessible by the normal operating environment and to a method for remote diagnosis and remote rectification of data loss.

SUMMARY OF THE INVENTION

It is an object of the present invention to provide a means to enable remote data recovery operations, including, but not limited to, those situations where the normal operating system is not operable.

One embodiment of the invention relates to a method of data recovery comprising the steps of:
   establishing a communications link via communications hardware from a local computer having a storage device requiring recovery of data to a remote data recovery computer operated by a technician;
   enabling the technician to interact with the local computer while having access to all data recovery programs which are resident at the remote data recovery computer; and
   enabling the technician to diagnose and rectify the data loss of the storage device of the local computer.

In one embodiment, the principles of the present invention are achieved by implementing a bootable data recovery operating system which has sufficient functionality to allow communications via communications hardware to the remote technician. The remote technician is further equipped with specialized remote control software which allows communications with the computer running the bootable data recovery operating system via communications hardware. Once the computer under recovery and the remote computer are in communication, data recovery operations on the computer under recovery can proceed under complete control of the remote technician.

In the preferred embodiment, the remote data recovery operating system is sufficiently small to operate directly from its own distribution floppy disk, allowing data recovery operations to proceed in the absence of the normal bootable operating system. It is capable of loading data recovery utility software from either that same distribution floppy disk, or from the remote technician's comparatively vast library of such software, via the communications hardware.

In the preferred embodiment, upon loading, the bootable remote data recovery operating system presents a limited number of choices to the local user, allowing the user to input information regarding the nature of the user's data recovery needs and the user's personal data. Once this information has been input, the local user can confirm his intent to have the operating system establish contact with the remote technician via attached communications hardware. This contact can commence the data recovery operation immediately, or, alternatively, may queue the request such that the data recovery operation proceeds at such time as the data recovery technician has had time to review the request and prepare for the data recovery operation. Once the data recovery operation commences, all control of the local computer is released to the remote data recovery technician. The technician is then able to operate the local computer as though the technician were seated directly in front of it, having access to all data recovery utility software which is available at the technician's site, as well as any which might optionally reside on the data recovery operating system diskette.

In use, data recovery using one embodiment of the present invention might proceed by booting or loading the bootable remote data recovery operating program into the memory of the user's local computer. The remote data recovery operating program then determines the specific hardware configuration of the user's local computer. The remote data recovery operating program might then interrogate the user for his/her name, address, telephone number, etc. It might also interrogate the user for an explanation of the data recovery situation. The remote data recovery operating program then establishes an initial telephone link via communications hardware with the remote data recovery computer and downloads the information entered by the user in the above steps. If time allows, the technician at the remote data recovery computer then takes control of the user's computer via the remote link and begins the remote data recovery process. Otherwise, a later time might be agreed upon for the remote data recovery process. Accordingly, the remote link is terminated and then re-established at the agreed upon time, whereupon remote data recovery commences.

These and various other advantages and features of novelty which characterize the invention are pointed out with particularity in the claims annexed hereto and forming a part hereof. However, for a better understanding of the invention, its advantages, and the objects obtained by its use, reference should be made to the accompanying drawings and descriptive matter, which form a further part hereof, and in which there is illustrated and described a preferred embodiment of the invention.

BRIEF DESCRIPTION OF THE DRAWINGS

In the drawings wherein corresponding reference numerals generally indicate corresponding parts throughout the several views;

FIG. 1 is a block diagram of an embodiment of an apparatus in accordance with the principles of the present invention;

FIG. 22 illustrates computer screens representing forms the user of the local computer may fill in to provide information regarding the identity of the user and the nature of the present data loss situation and the corresponding service desired;

FIG. 23 illustrates computer screens which provide information to the administrators of the Remote Data Recovery Facility in order to manage the communications server;

FIG. 25 contains descriptive drawings of data structures utilized in an embodiment of the local Remote Data Recovery application;

FIG. 26 contains descriptive drawings of further data structures utilized in an embodiment of the local Remote Data Recovery application as well as descriptive drawings of data structures utilized in an embodiment of the Remote Data Recovery Communications Server application;

DETAILED DESCRIPTION OF THE INVENTION

Figure 2:
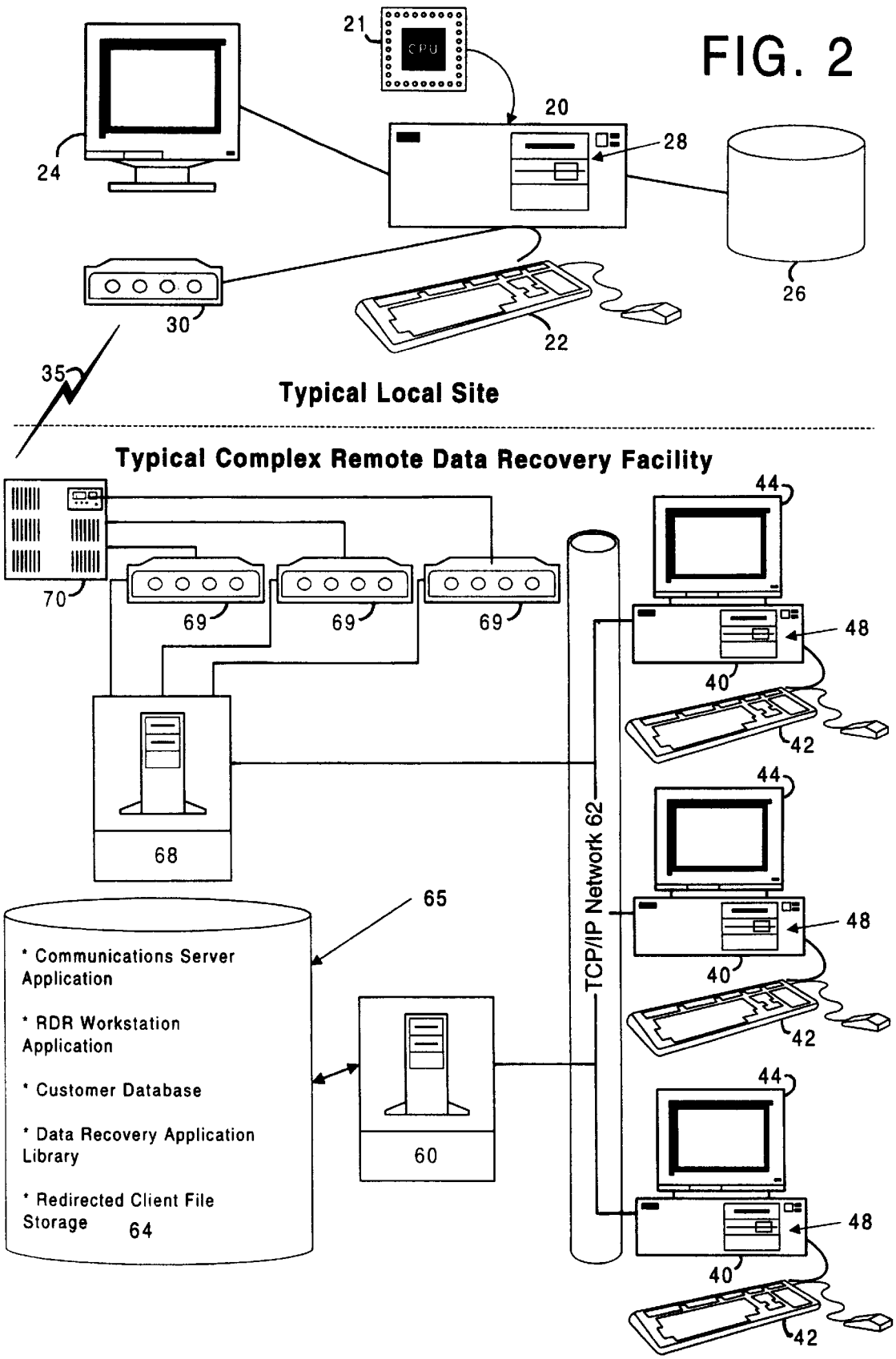
FIG. 2 is a block diagram of another embodiment of an apparatus in accordance with the principles of the present invention.

Referring now to the drawings, an embodiment of an apparatus and method for remote recovery of data is now described. Illustrated in FIG. 1 is a block diagram of an embodiment of the present invention. A local remote data recovery (RDR) computer 20, for which a data recovery procedure is needed, is illustrated as having a central processing unit (CPU) and memory 21 (typically arranged on a common system board), a local input device 22, a local display 24, a local storage device 26, and a removable media storage device 28. In addition, the local RDR computer 20 is shown as having a local communications hardware unit 30 for communicating with other computers, for example a modem or a network card. The local RDR computer 20 might be any IBM compatible system or other type of computer system commonly sold by various vendors such as GATEWAY 2000, IBM, APPLE, Hewlett Packard, Compaq, etc. In particular, the main system board of the local RDR computer 20 might have an INTEL CPU, such as a 38G, 486, or 586, or any other microprocessor along with suitable amount of random access memory (RAM). The local input device 22 might be any suitable type of user input device such as a keyboard, mouse, pointer, touch sensitive display screen, etc. More than one user input device 22 might be present. The local display 24 might be any suitable display device such as a visual display unit. The local storage device 26 might be internal or external and might take on varying technologies. The storage device might be a conventional hard drive such as of the Winchester technology, a laser disk, a CD-ROM, etc. The removable media storage device 28 might be a conventional floppy drive or any other suitable removable media drive. The local communications hardware unit 30 might be any conventional type of modem device such as a Hayes compatible modem, an ISDN modem, a wireless modem, or may alternatively be conventional local area network, wide area network or Internet (LAN/WAN/InterNet) connectivity hardware, such as a network card, etc.

An embodiment of a remote data recovery (RDR) workstation 40 for remote data recovery is shown in FIG. 1 having a CPU and associated memory 41, a remote input device 42, remote display 44, a remote storage device 46, and a remote removable media storage device 48. The RDR workstation 40 is also shown as having a remote communications hardware unit 50, such as a modem or network card. It will be appreciated that the RDR workstation 40 and its associated components might be the same as described for the local RDR computer 20 above. It will also be appreciated that the main communications channel 35 between the local RDR computer 20 and the RDR workstation 40 may be a telephone line or traditional LAN/WAN/InterNet connectivity communications channels.

Illustrated in FIG. 2 is yet another embodiment of a system in accordance with the principles of the present invention. In this embodiment, a plurality of RDR workstations 40 are interconnected by a local area network. In the embodiment shown, a file server 60 interconnects the RDR workstations 40 by way of a network 62, preferably a TCP/IP network. The file server 60 has data 64 stored on network shared drives 65 such that the data is accessible by the RDR workstations 40 and the Communications Server 68. The RDR workstations 40 are capable of communicating via the TCP/IP network 62 with the Communications Server 68 in such a fashion as to allow the establishment of one or more logical connections between a selected RDR workstation 40 and any arbitrary network communications hardware unit 69. The network communications hardware units 69 may be modems connected to outside telephone lines or may be network hardware connected to the LAN/WAN/InterNet, or the like. The network hardware communications units 69 communicate with local RDR computers 20 via a communications switch 70, such as a PBX. Accordingly, any one of the RDR workstations 40 may be used to recover data from a local RDR computer 20 over the communications channel 35 concurrently with multiple other RDR workstations 40 being used to recover data from different local RDR computers. This embodiment may be used to allow access to any one of a number of technicians to provide remote data recovery upon dialing a single number, or connecting to a single entity on the LAN/WAN/InterNet.

In the preferred embodiment, a remote data recovery operating program is provided to owners/purchasers of the local RDR computer 20 on a removable storage medium such as a floppy diskette. The program may be purchased at the time of purchasing a computer or, alternatively, purchased through retail outlets or mail order at a later date. It may, additionally, be provided through any number of electronic distribution mechanisms, including the BBS-like operational mode ("Guest Model") of the Communications Server 68 and its network communications hardware unit 69.

The programs thus provided by the remote data recovery operating program include sufficient functionality to allow operation of the local RDR computer 20 and communication via the local communications hardware unit 30 with the RDR workstation 40.

Figure 3:
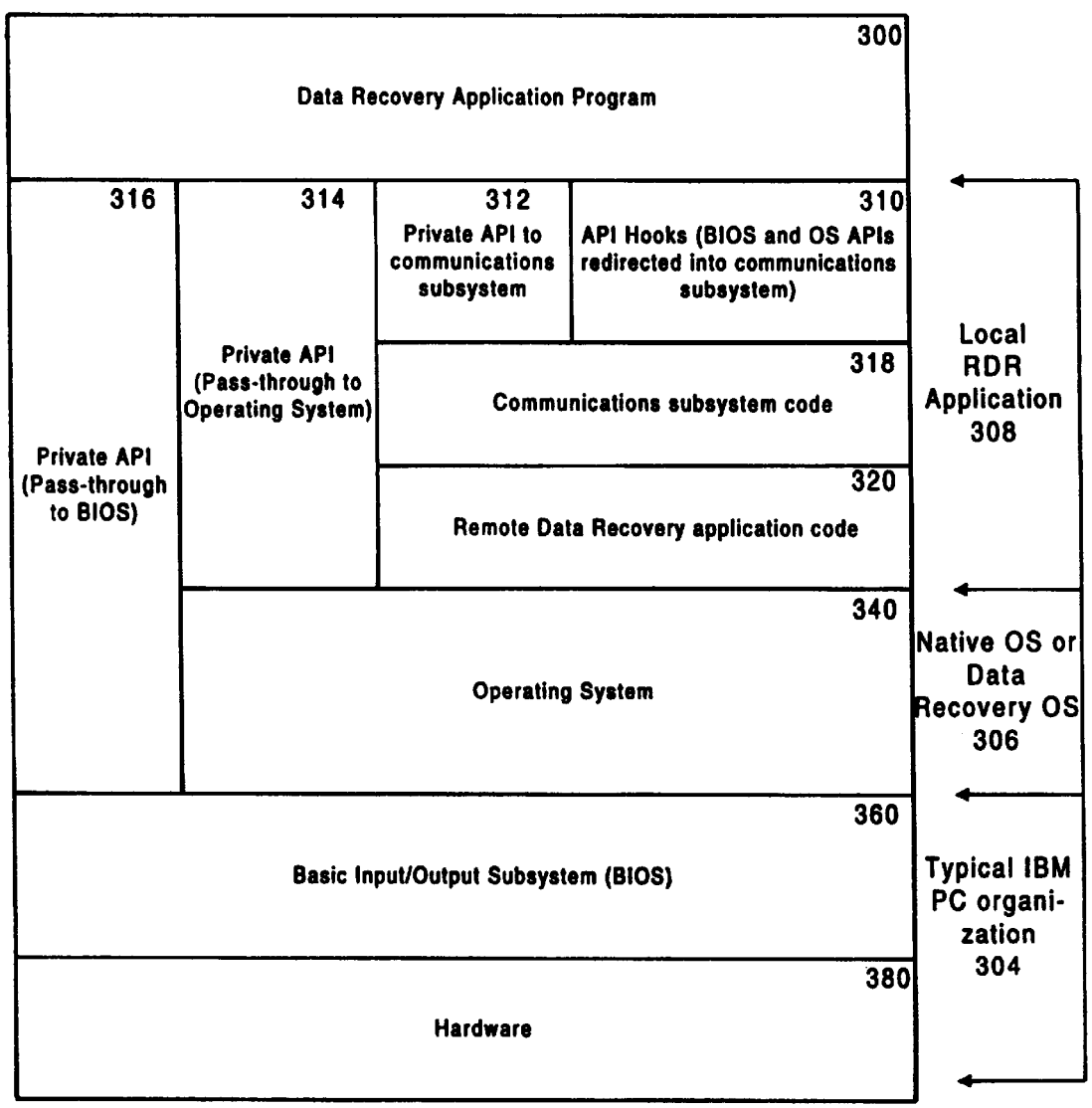
FIG. 3 is a software hierarchy diagram of the local environment of an embodiment of the present invention.

FIG. 3 describes the various software components which comprise the remote data recovery operating program. Various Data Recovery Application programs 300 operate to effect the data recovery and/or diagnostic processes. Such programs might include storage device functional diagnostic routines, storage media analysis routines, sector editors which work in hexadecimal, ASCII, or other formats relevant to the file system under recovery, file unerase routines, and filesystem integrity checking/repairing routines relevant to the file system under recovery. These Data Recovery Application programs 300 correlate in general terms to routines found in the NORTON UTILITIES® or Ontrack's ODR-N™ or DOSUTILS® software packages.

The Data Recovery Application DRA programs 300 interface with the local RDR application 308, through a set of application program interfaces (API's) 310 which interface direct with the basic input/output subsystem (BIOS) 360 and/or the Operating System 340. The local RDR application 308 effectively redirects, or "hooks" these API's in order to allow remote control operation of the DRA 300. Additionally, the local RDR application 308 offers private API's which allow "RDR aware" applications to interface directly with the communications subsystem 312 by providing a "pass through" to "hooked" BIOS functions 316 and OS functions 314. This permits "RDR aware" applications to bypass the redirection of functions, thus enabling an interface to the operator of the local RDR computer 20, as well as the control of the communications subsystem. The remainder of the local RDR application 308 contains communications subsystem code 318 and the local RDR application code 320. A flow diagram of the local RDR application code 320 is shown in FIG. 4.

The software components of such a system may include a Data Recovery Operating System (DROS) 306 as the local RDR computer operating system 340. The DROS 306 allows remote data recovery to occur when the local RDR computer's native operating system does not function. The DROS 306 includes routines necessary to support the local RDR application 308 and any desired data recovery application programs 300 used to perform the data recovery process. Examples of such necessary routines include memory management, file system access and management, application program loading and execution, and peripheral device control functions. These routines generally equate to several of the MS-DOS interrupt 21H functions. In order to allow the local RDR application 308 to operate in addition to any Data Recovery Application programs 300, the DROS 306 may directly emulate the native operating system's calling conventions and protocol. Additionally, a user command interpretation functionality which resembles the native command line interpreter may be provided. The local RDR application 308 may also be run using the native operating system as the local RDR computer operating system 340.

In the example of IBM Compatible Personal Computers, interface to the underlying hardware 380 is achieved through a common interface effected by the Basic Input/Output Subsystem, or BIOS, 360.

Figure 4:
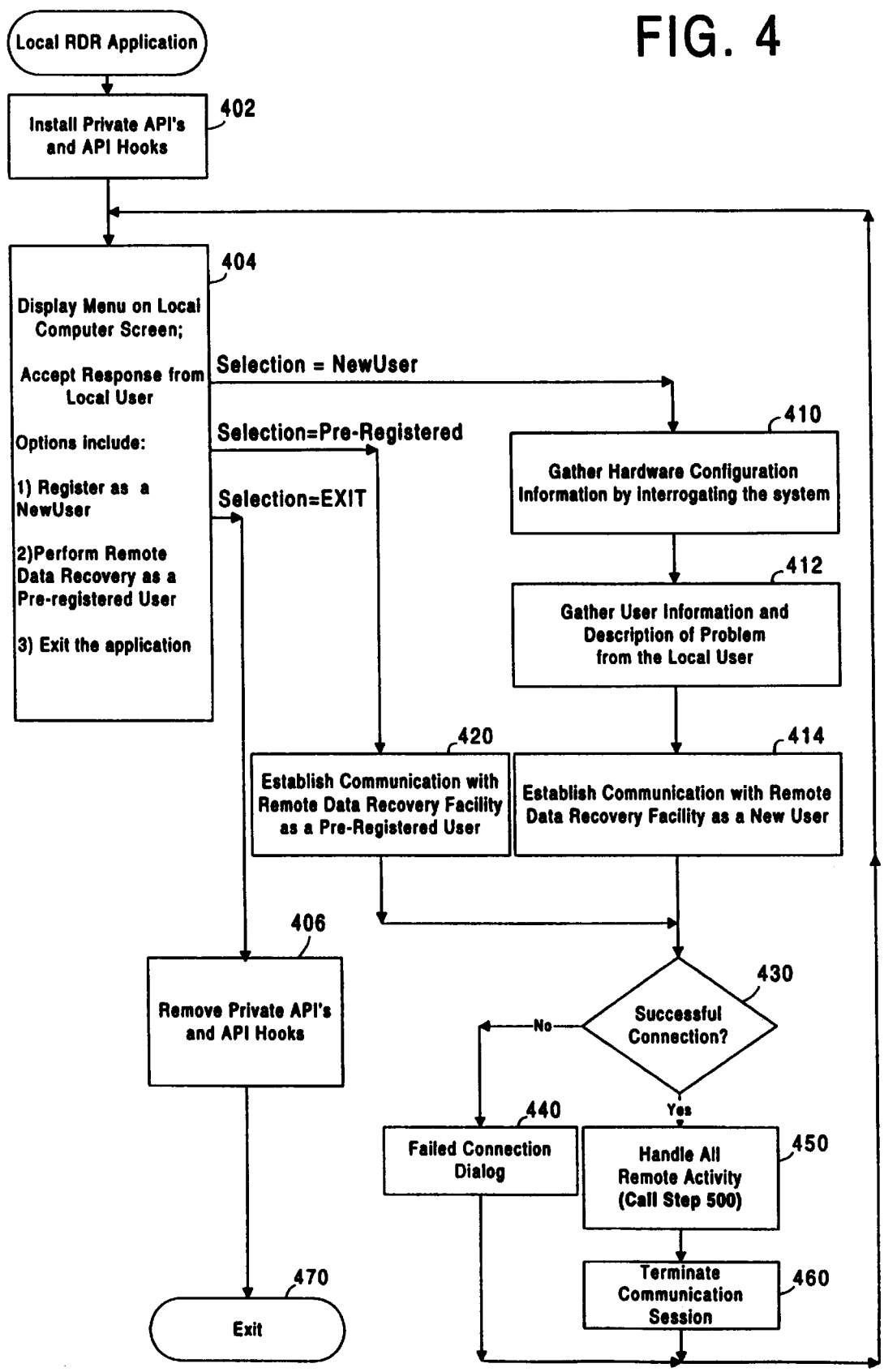
FIG. 4 is a flow diagram of the local RDR application of an embodiment of the present invention.

The flow diagram of FIG. 4 describes the operation of the local RDR application 308. Upon program entry at step 402, the Private API's 312, 314 and 316 are installed and appropriate Operating System and BIOS "hooks" are installed. This causes any subsequently loaded program to operate under remote control. At step 404, a menu is offered to the operator of the local RDR computer 20 which allows him to specify operation as a New User, a Pre-Registered User, or to Exit the local RDR application 308.

If the New User option is chosen, in step 410, routines are invoked which assess the hardware configuration of the local RDR computer. The user is then requested, at step 412, to fill in forms 2210 and 2220 with information regarding the user's identity, phone numbers, etc., as well as a description of the circumstances and nature of the data recovery situation. Upon completion of the forms, an attempt is made, in step 414, to dial and establish communication with the Remote Data Recovery Facility as a New User.

If the Pre-registered User option is chosen, an immediate attempt is made, in step 420, to dial and establish communication with the Remote Data Recovery Facility as a Pre-registered User.

If the attempt at connecting to the Remote Data Recovery Facility is determined to be unsuccessful, at step 430, a dialog indicating the failed connection is presented, in step 440, to the operator of the local computer, and control is returned to the menu.

If the connection to the Remote Data Recovery Facility is determined to be successful, at step 430, remote controlled activity, under the complete direction of the remote site, is handled according to the logic described hereinbelow, in step 450. When complete, the communications session is terminated, in step 460, and the communications hardware is instructed to terminate the communications session.

If the EXIT option is selected, the local RDR application 308 removes the Private API's 312, 314 and 316 and the previously installed Operating System and BIOS "hooks", at step 406.

Figure 5:
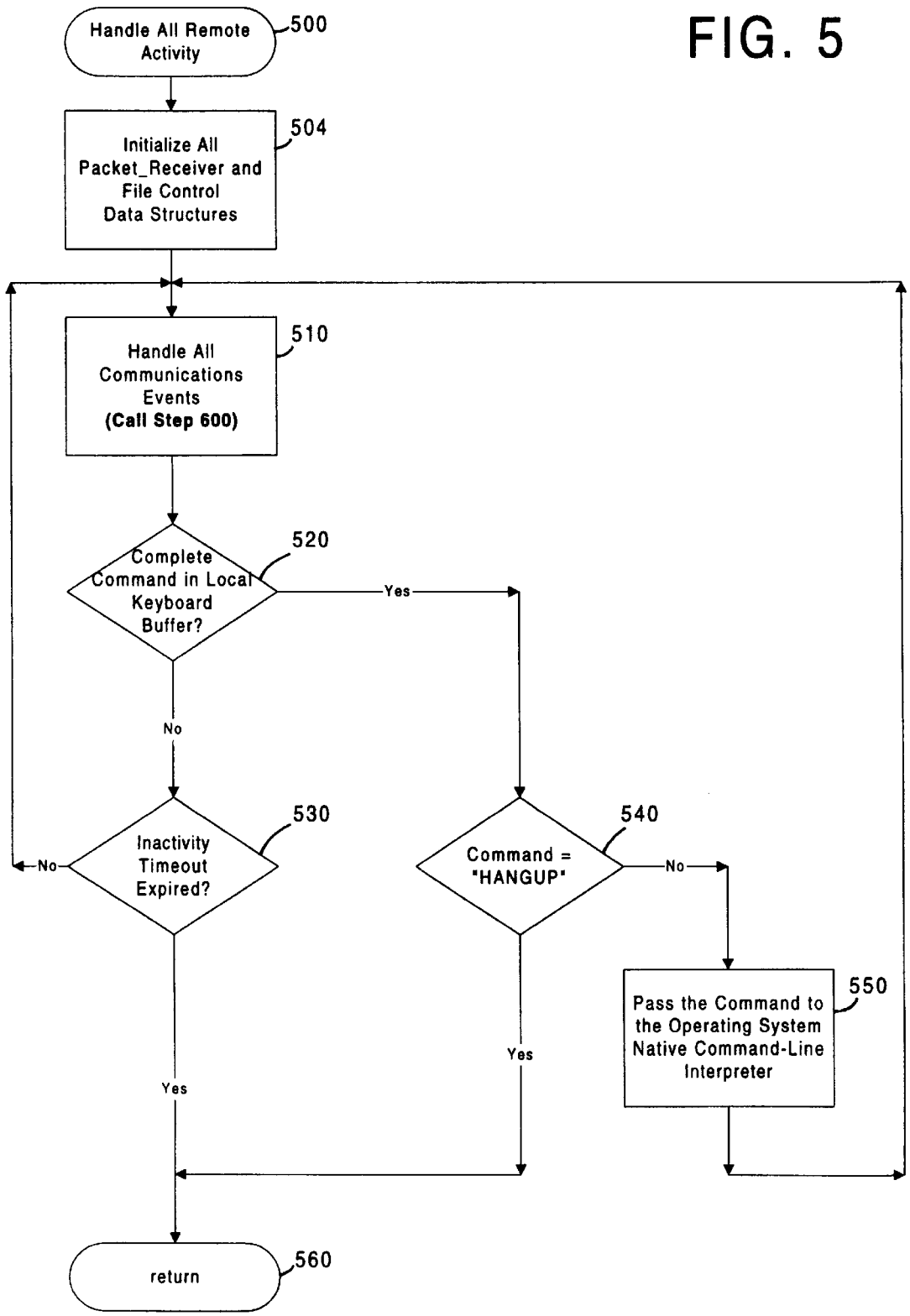
FIG. 5 is a flow diagram of a portion of the local RDR application of an embodiment of the present invention which facilitates remotely controlled operation of the local computer.

FIG. 5 is a flow diagram of the portion of the local RDR application 308 which executes during remote control operation. Following the initialization, in step 504, of critical data structures which govern communications packet reception and file redirection control, the local RDR application 308 enters a loop, steps 510–550. This loop continually handles all communications events, in step 510, and dispatches any commands which may have been sent from the Remote Data Recovery Facility. Once it has been determined, in step 520, that a complete remote command has been received from the Remote Data Recovery Facility, and stored in the local keyboard buffer, the remote command is screened, in step 540, to see if it is a command to hang-up. If a hang-up command has been received, then the routine exits, step 560. If the command is not a hang-up command, as determined by step 540, then the command is passed to the operating system's native command line interpreter, in step 550. Note that the local keyboard buffer is filled by a command originating at the remote input device 42, preferably a keyboard. If it has been determined, at step 520, that there is not a complete command in the local keyboard buffer, then an inactivity timeout detects communication failure, at step 530, and causes an appropriate exit at step 560. The corresponding activity directed by the remote site is described in reference to FIG. 12.

Figure 6:
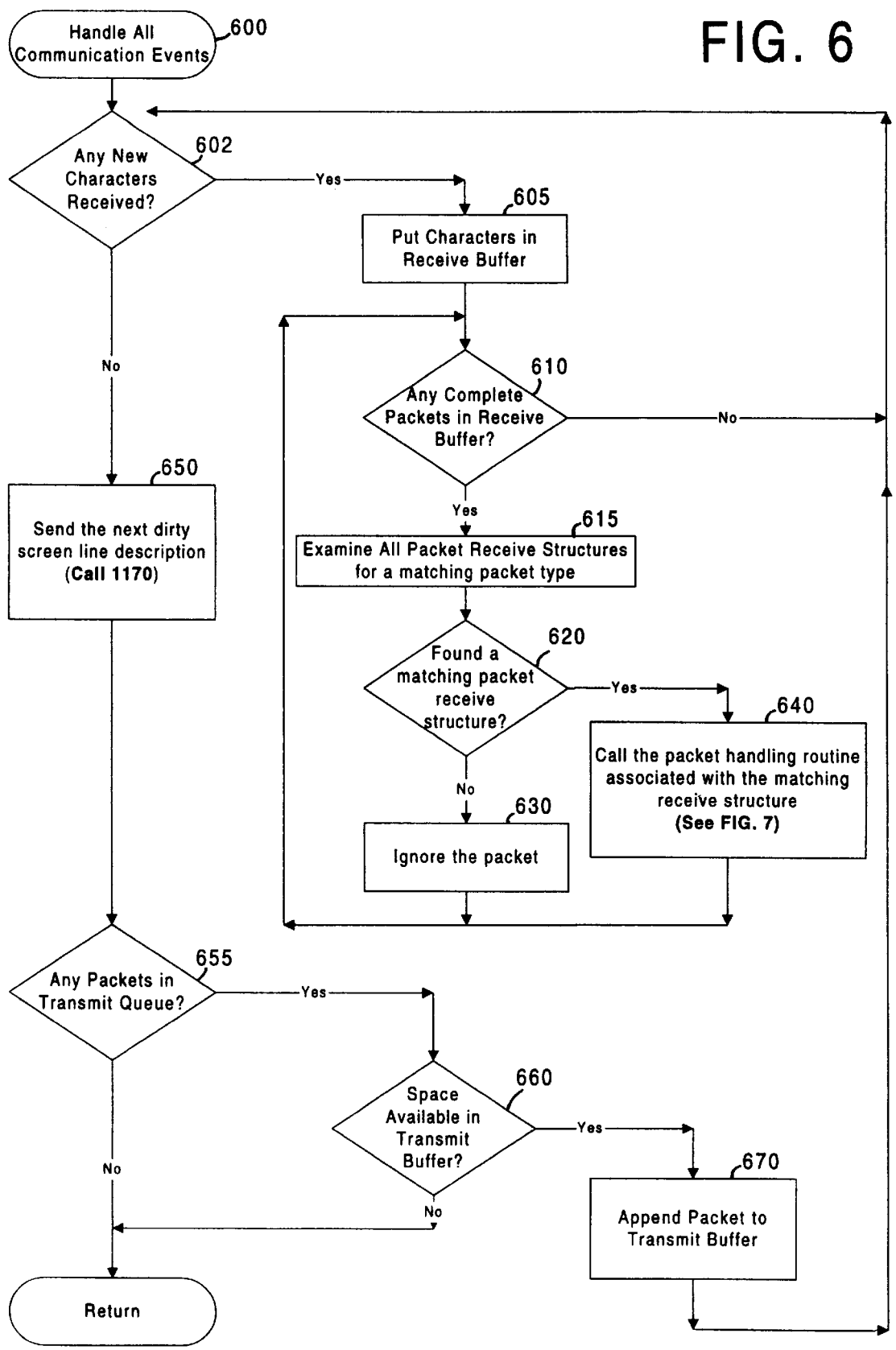
FIG. 6 is a flow diagram of a portion of the local RDR application of an embodiment of the present invention which handles communications channel events.

The flow diagram shown in FIG. 6 describes the communication event handler within the local RDR application 308.

Figure 7:
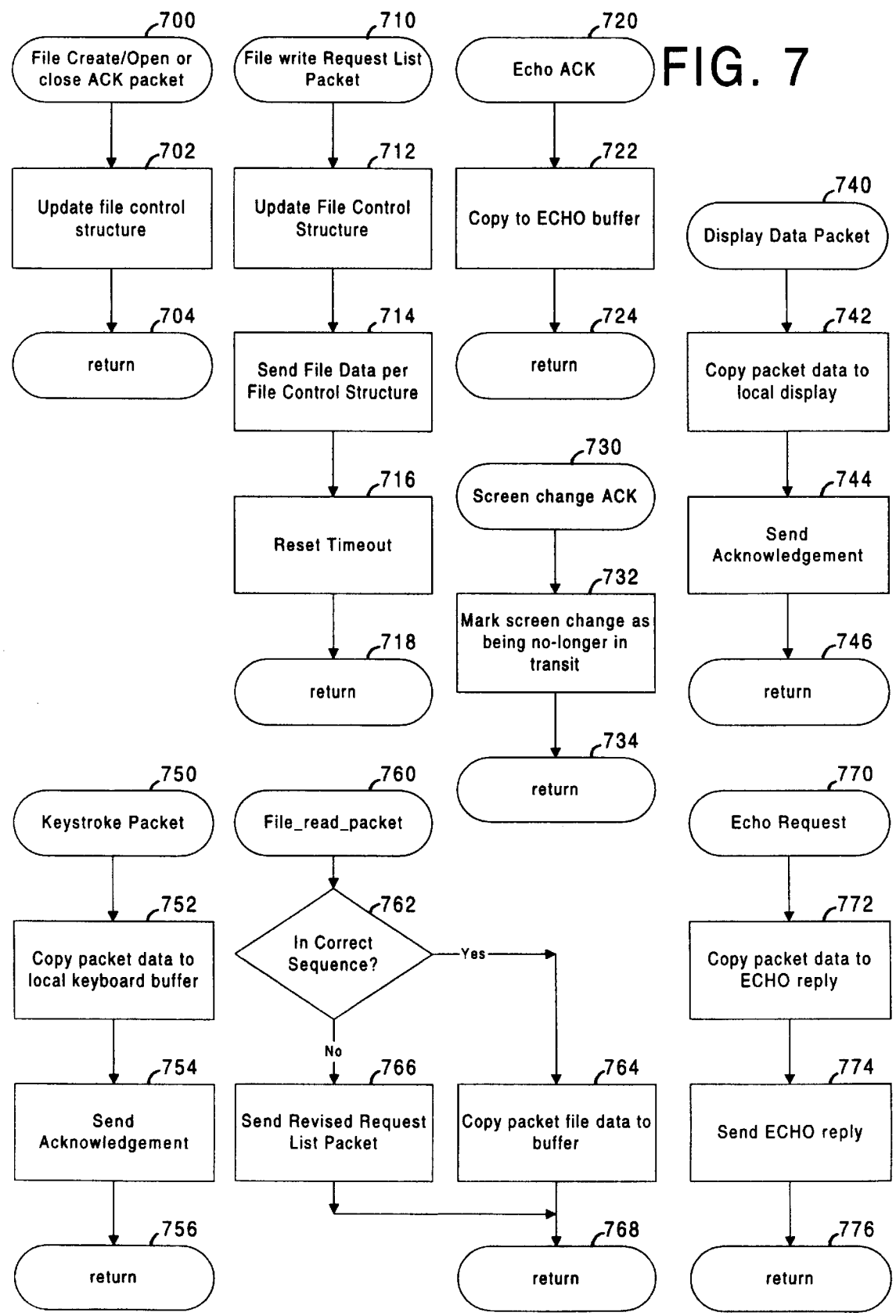
FIG. 7 is a flow diagram of a portion of the local RDR application of an embodiment of the present invention which handles miscellaneous incoming data packets.

The communication event handler is called from a multitude of points within the local hooks, for instance step 450, and several of the Operating System and BIOS hooks. The intent of the communication event handler is to service the communications driver, and dispatch any incoming packets, steps 602 through 630. After initiation of the communication event handler, at step 600, the routine determines if any new characters have been received, at step 602. If characters have been received, then the characters are placed in the receive buffer, at step 605, and then a check is made to see if there are any complete data packets in the receive buffer, at step 610. If there are any complete packets in the receive buffer, then these completely formed packets are compared to a list of packet receive control structures 2610. The list is maintained as a singly linked list via the pointer link field 2612. The list is searched to find a matching packet receive control structure. If the type field of the packet matches the packet type number field 2614 of the packet receive control structure 2610, then the packet counter field 2616 is incremented and the routine pointed to by the packet handler routine pointer field 2618 is called. A number of packet handling routines are illustrated in FIG. 7, including file create/open or close ACK packet, step 700, file write-request-list packet, step 710, echo acknowledgment, step 720, screen change acknowledgment, step 730, display data packet, step 740, keystroke packet, step 750, file read packet, step 760, and echo requests, step 770. If, however, the packet received does not match, as determined at step 620, then the packet is ignored, at step 630, and the routine returns to searching for complete packets in the receive buffer, at step 610. If no new characters are received at step 602, then a call is made, at step 650, to ensure that any screen updates which may have occurred but were not able to be sent previously are given the opportunity to reach the transmission queue. Additionally, a determination is made, in step 655, to see if there are any outgoing packets in the transmit queue. If there are, and if there is space available in the transmit buffer, as determined at step 660, then the outgoing packet is appended to the communications driver's transmission buffer, at step 670. The transmission queue is implemented by a singly linked list of outgoing packet descriptors as shown at 2510 of FIG. 25. Each packet descriptor contains a link 2511 to the next element of the list, followed by a collection of fragment length 2512 and fragment pointer 2514 pairs. Each pair describes a region of memory which would comprise the packet to be formed and transmitted. The collection of pairs is terminated by an entry with a length field of zero as shown at 2516. The packets themselves are formed using this "gather write" principle, and, incorporating whatever other encoding, framing, and error control methods as may be deemed appropriate by the implementor prior to placing the data in the transmit buffer at step 670.

FIG. 7 contains flow diagrams representing the behavior of the local RDR application 308 as it handles various packet types.

File Create Acknowledgment, File Open Acknowledgment, and File Close Acknowledgment packets are received at step 700 in response to those packets which were sent requesting the File Create/Open/Close action to occur at the Remote Data Recovery Facility. These File Create/Open/Close Acknowledgment packets are handled at step 702 by merely updating the appropriate file control structure 2520 to reflect the fact that the request has been acknowledged, and to post the status of the File Create/Open/Close operation. This allows the File Create/Open/Close operation which is being acknowledged to proceed.

File Write Request List packets are received, at step 710, in response to an initial File Write request. These File Write Request List packets contain a list of those file segments which the Remote Data Recovery Communications Server is prepared to receive. File Write Request list packets are handled by updating, at step 712, the file control structure 2520 to reflect the new request list, and subsequently sending file write data packets, at step 714, per the updated file control structure 2520. Additionally, updating the file control structure 2520 resets the timeout, at step 716. The file read and write hooks are described further with reference to FIG-10.

Echo Acknowledgment packets are received, at step 720, as a response to an Echo Request. This echo mechanism is provided for communications diagnostic capabilities. Echo Acknowledgment packets are handled by copying the data content to a dedicated echo buffer, in step 722, such that the program can subsequently further analyze the echo data.

Screen Change Acknowledgment packets are received, at step 730, in response to Screen Change Packets. Screen Change Acknowledgment packets are handled by marking the screen change as no longer being in transit, at step 732.

Display Data Packets are received, at step 740, as instructions to place text on the local RDR computer monitor 24. Display Data Packets are handled by copying the packet data to the local display 24, at step 742, and then sending a Display Data Acknowledgment packet, at step 744, to notify the Remote Data Recovery Communications Server that the packet was successfully received and rendered on the local display 24.

Keystroke Packets are received, at step 750, as keystrokes occur at the RDR workstation 40, and are forwarded through the RDR Communications Server 68. Keystroke Packets are handled by copying the packet keystroke information, at step 752, into the local keyboard buffer. This allows the local RDR application 308 to asynchronously retrieve these keystrokes and interpret them as desired. A Keystroke Acknowledgment packet is then returned, at step 754, after the keystrokes are stored in the local keyboard buffer for subsequent interpretation by the operating system or application programs in the local RDR computer 20.

File Read Data packets are received, at step 760, in response to a File Read Request List packet. File Read Data packets contain actual remote file data segments which have been read and forwarded by the RDR Communications Server 68. File Read Data packets are handled by checking, at step 762, to see if the file segment is the expected segment number in sequence. If not, a revised Read Request List packet is sent, at step 766. If the incoming packet contained the expected sequential segment number as detected at step 762, then the file data is copied to the data buffer, at step 764.

Echo Request Packets are received, at step 770, as a communications diagnostic request. Such an Echo Request Packet is responded to by copying packet data, at step 772, from the Echo Request Packet, and sending an Echo Reply packet, at step 774.

Figure 8:
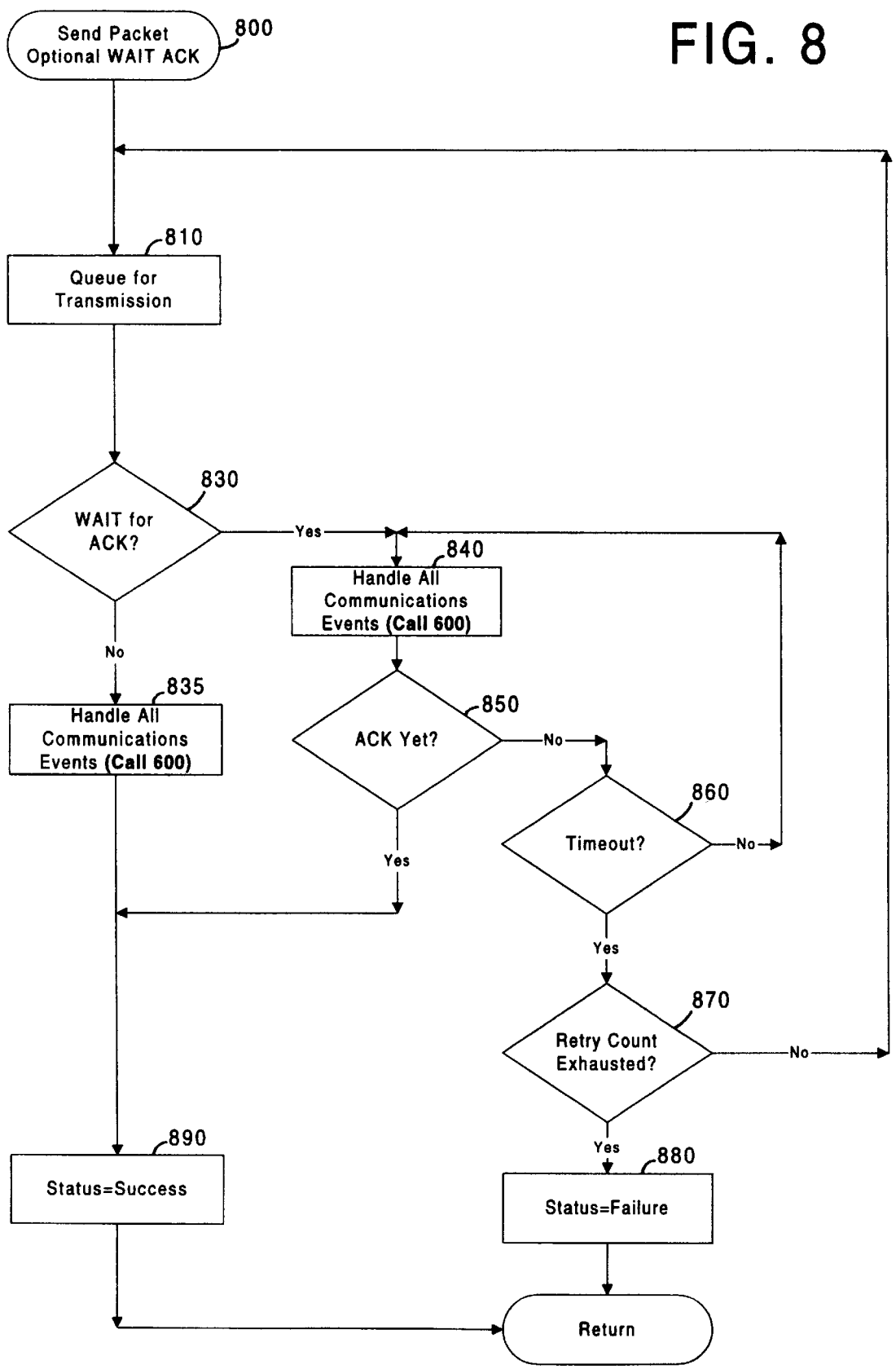
FIG. 8 is a flow diagram of a portion of the local RDR application of an embodiment of the present invention which sends outgoing communications data packets.

FIG. 8 is a flow diagram of the communications packet send routine within the local RDR application 308. The routine starts by placing the packet for transmission into the transmit queue, at step 810. If the local RDR application 308 calling this routine 800 has requested that this routine 800 not wait for an acknowledgment (ACK), as determined at step 830, then the routine makes a call, at step 835, to the communications event handler, at step 600, to ensure that the packet has an opportunity to be transmitted, then exits with successful status, at step 890. If the local RDR application 308 has requested that this routine should wait for an acknowledgment (ACK), as determined at step 830, a loop is entered which handles communications events until either an ACK occurs, at step 850, leading to a successful exit at step 890, or until a timeout condition is determined at step 860. In the case of a timeout condition, the sequence of transmitting the packet and waiting for an acknowledgment is retried a limited number of times, as determined by step 870. A failure after the retry count is exhausted results in a failure status exit, at step 880.

Figure 9:
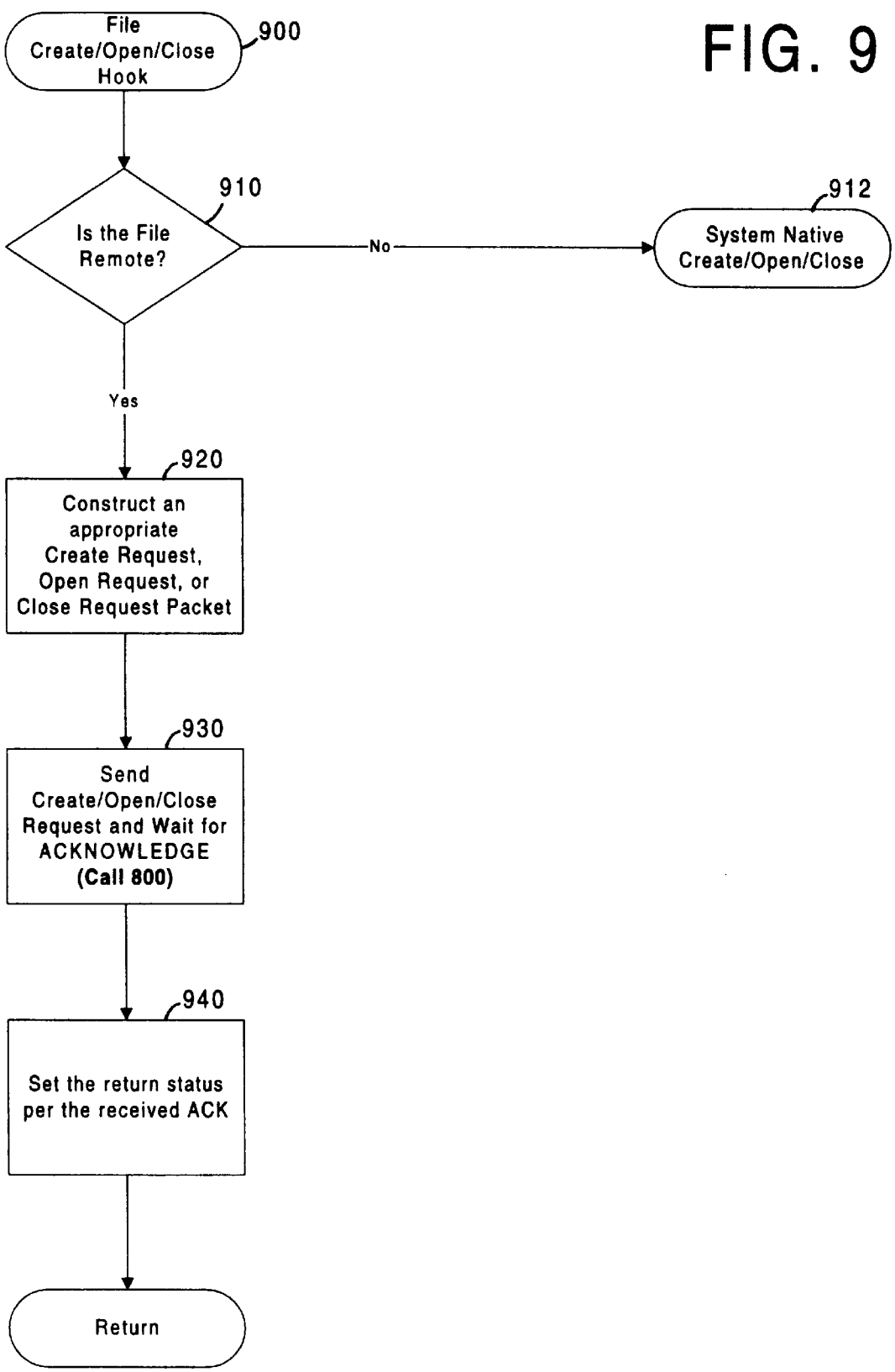
FIG. 9 is a flow diagram of a portion of the local RDR application of an embodiment of the present invention which intercepts and processes the native operating system API for file create/open/close functions.

FIG. 9 is a flow diagram of the File Create/Open/ Close interceptor, or "hook" within the local RDR application 308. This procedure is installed to preempt an attempt by the application to create, open, or close any arbitrary file. The behavior of this hook is first to determine if the file is a remote or local file, at step 910. This is performed during file open/create operations by examining the file-name supplied by the caller of this routine, be it the local RDR application 308 or a Data Recovery Application 300, utilizing any arbitrary convention for naming remote files which can easily distinguish them from local files, and is performed during file close operations by examining the file-handle supplied by the local RDR application 308. If the file is determined to be local by the test, at step 910, execution is transferred to the system's native file create/open/close procedure, at step 912. If the file is determined to be remote, at step 910, an appropriate file create request, file open request, or file close request packet is constructed, at step 920. This packet is then sent, and an acknowledge is waited for, at step 930. The acknowledgment received back reflects the status of the request at the remote end, which affects the content of the file control structure 2520, at step 940. The status is then returned to the operator of the local RDR computer 20 as per the native system's file create/open/close conventions. In the case of remote file create and/or open activities, a file handle is be returned to the caller which is easily distinguishable from any file handle which may have legitimately been returned from the system's native file create or open process. This allows future read/write/ close operations to distinguish local files from remote files.

Figure 10:
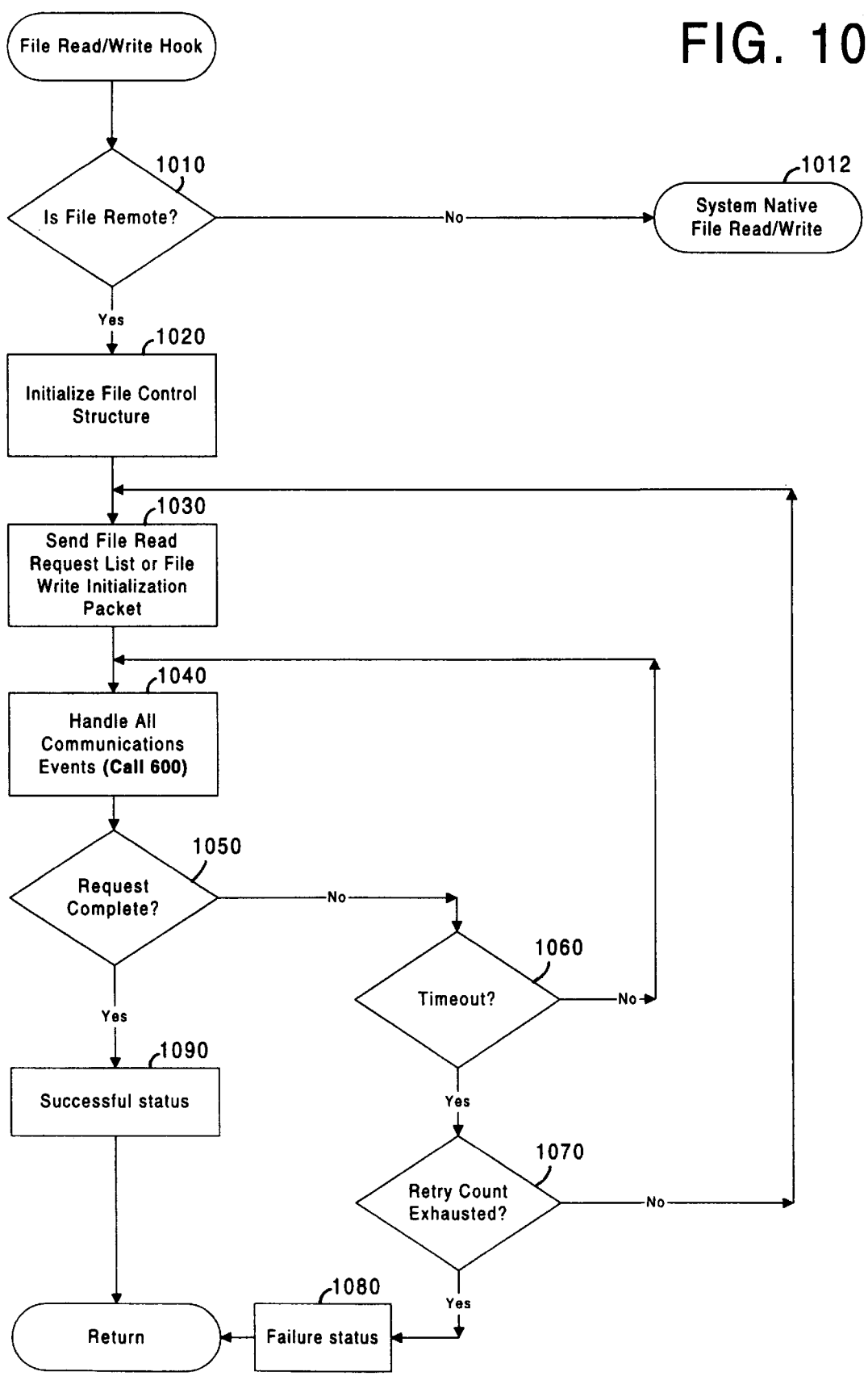
FIG. 10 is a flow diagram of a portion of the local RDR application of an embodiment of the present invention which intercepts and processes the native operating system API for file read and write functions.

FIG. 10 is a flow diagram of the File Read and Write interceptor, or "hook" within the local RDR application 308. This procedure is installed to preempt any application attempt to read or write any arbitrary file. The behavior of this hook is first to determine if the file is a remote or local file, at step 1010. This is performed by examining the file-handle supplied by the caller of this routine, be it the local RDR application 308 or a Data Recovery Application 300. If the file is determined by the test to be local, at step 1010, execution is transferred to the system's native file read or write procedure, at step 1012. If the file is determined to be remote, then the file control structure 2520 is updated to reflect the nature of the request at step 1020. Based on the content of the file control structure 2520, an appropriate file read-request or write-request packet is constructed and sent at step 1030. A loop is then entered, at step 1040, which continues handling communications events, step 600, and tests whether the read or write request is completely satisfied at step 1050. If the request has been satisfied, then a successful status is returned to its caller, at step 1090, per the native system's file read/write conventions. If the request is not complete, as determined at step 1050, timeout conditions are monitored at step 1060. If no timeout has occurred, then the routine continues to handle communications, at step 1040, and to monitor for completed requests, at step 1050. If a timeout occurs, at step 1060, then the request is resent, at step 1030 for a limited number of retries. If the retry count becomes exhausted, at step 1020, then the request returns failure status, step 1080, per the native system's file read/ write conventions.

Figure 11:
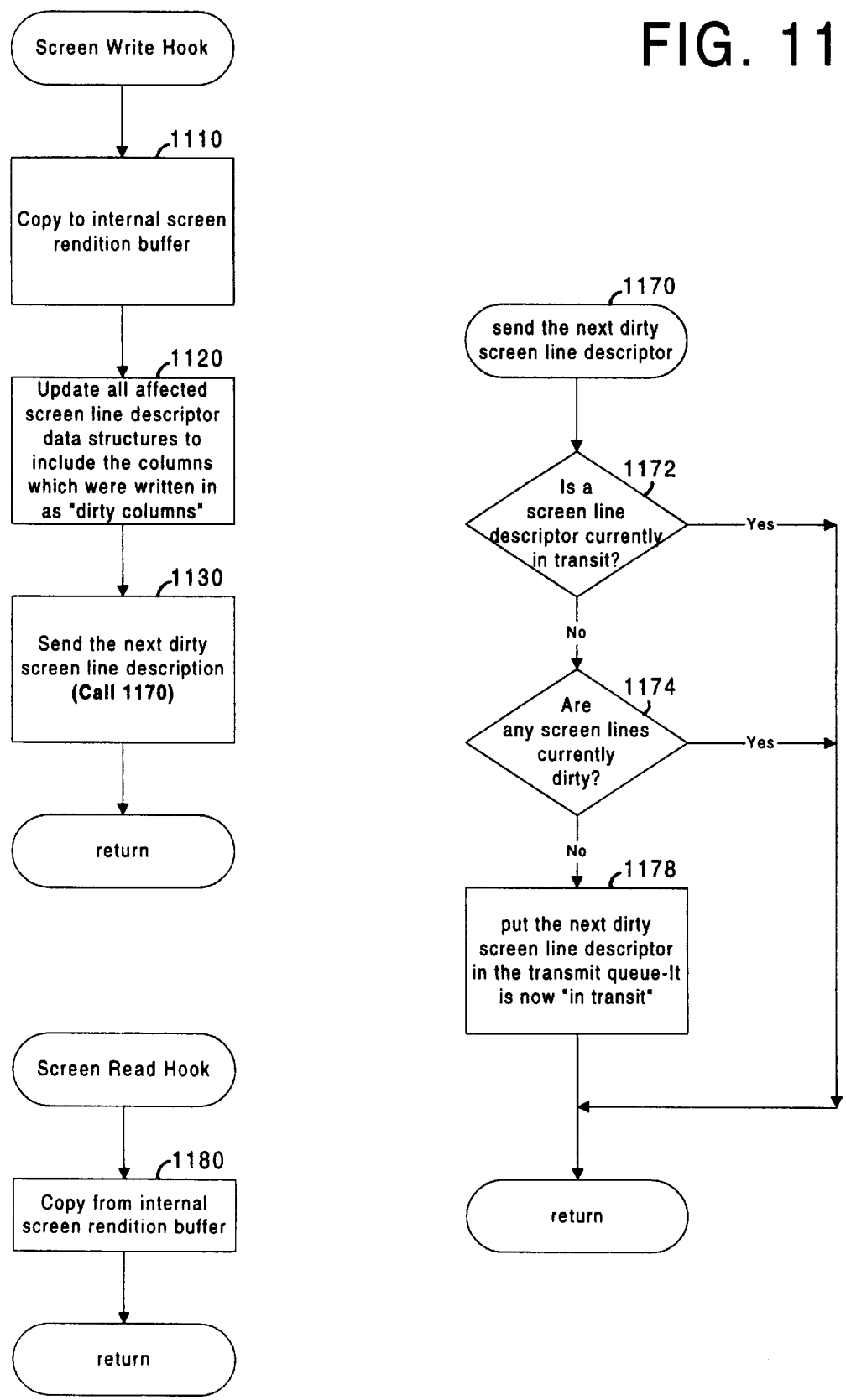
FIG. 11 is a flow diagram of a portion of the local RDR application of an embodiment of the present invention which intercepts and processes the native operating system API for display-screen read and write functions.

The flow diagram for the "hooks" of display screen write and read functions of the local RDR application 308 is shown in FIG. 11. The mechanism suggested intends to record and transmit screen changes to the remote site in a timely fashion with minimal impact on program execution. The screen write function is implemented by first copying the desired screen write information into an internal buffer, at step 1110, which entirely describes the state of the display screen. The purpose of this buffer is to facilitate the screen read hook, at step 1170, as well as to provide the source for screen update packets as they are formed and transmitted. The preferred embodiment utilizes a screen line change descriptor data structure for each line of characters in the local RDR computer display 24. These screen line change descriptors, shown in FIG. 25 at 2560 describe, for each associated line of characters, the range of columns for which characters have been modified by application programs and those modified characters have not yet been placed in the queue for transmission. This range of modified but unsent columns are referred to as the "dirty" range for that line, and are described by the screen line change descriptors 2560 by entries which mark the first (left-most) dirty column 2562 and the last (right-most) dirty column 2564 for each screen line. Following the copying of the new screen characters to the internal buffer, at step 1110, the screen line change descriptors for each affected display line will be modified to ensure that the "dirty" range includes these newly written columns. A call is then made at 1130 to place any unsent screen changes in the transmission queue 2510 for subsequent transmission to the RDR workstation 40.

Attempts to send screen change descriptions to the remote site are described in 1170–1178. If screen change descriptions are presently being sent and are unacknowledged, for example because they are in transit, as determined at step 1172, then no attempt is made to send screen change information at this time. If there exist no current screen change descriptions representing unsent screen changes, determined at step 1174, then no action is taken. If the previous conditions are not met, then the next screen line change descriptor describing a non-zero dirty range is utilized to add an entry at 1178 into the transmission queue which will send the associated dirty screen content from the internal screen buffer. The screen change is now "in-transit", and the associated screen line change descriptor can be cleared. When a subsequent acknowledgment of this screen line change packet is received, the screen change is considered no longer to be "in transit", per step 730. Should a timeout occur without acknowledgment, the screen line change description will be re-transmitted.

The display screen read function hook is implemented by copying the desired information to the local RDR computer's buffer directly from the internal screen rendition buffer, at step 1180.

Figure 12:
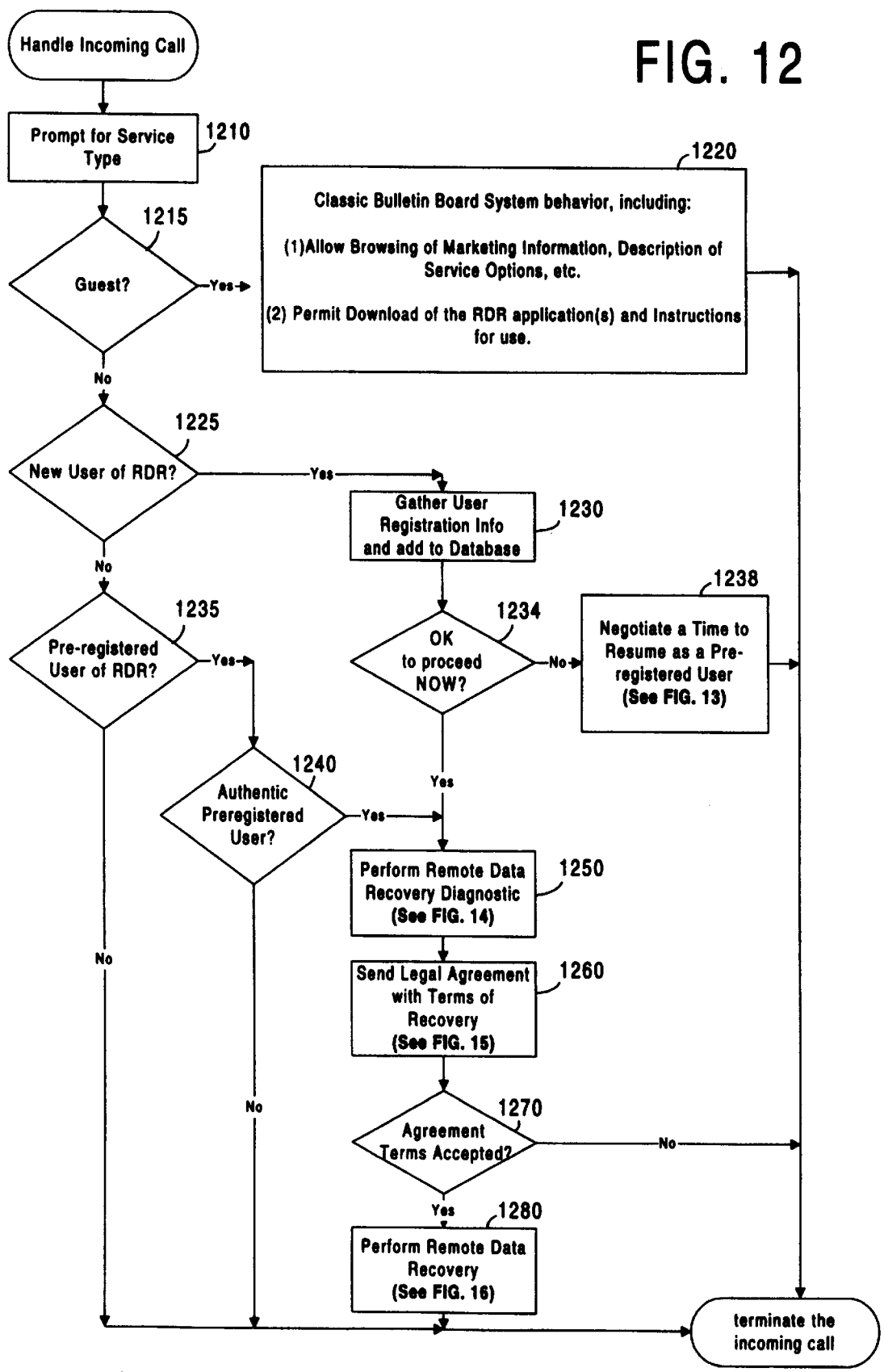
FIG. 12 is a flow diagram of the RDR Communications Server application of an embodiment of the present invention.

The main application which implements the RDR Communications Server application in an embodiment of the present invention is described in the flow diagram of FIG. 12. Typically, an application thread for each network communications hardware unit 69 is started which executes steps 1210 through 1280. Upon receipt of an incoming phone call, an ASCII prompt is transmitted, requesting the operator of the local RDR computer 20 to supply the desired service type, at step 1210. This allows use of the Remote Data Recovery Communications Server by traditional "dumb" terminal applications as well as by highly automated call transactions from the local RDR application 308.

In a typical situation where the RDR Communications Server application is called by an arbitrary user with a dumb terminal, the user can respond to the prompt, set at step 1210 as a "guest". This causes the RDR Communications Server application to behave as a classic bulletin board service, with functionality limited only by the creativity of the programmer and the abilities of the local operators terminal application. The usefulness of this "guest" category of service is that it may be used to promote the organization's services/products, in the manner of a classic BBS. Further, it may be used as a download facility to allow the distribution of the local RDR application 308 and associated programs.

Once the local RDR application programs are in the possession of the local user, the local user may install and utilize the applications to access the "new user" category of service from the RDR Communications Server application. The local RDR application 308 is knowledgeable of the prompt set at step 1210 and responses which are expected by the RDR Communications Server application, and are described in FIG. 4.

At step 1225, the RDR Communications Server application determines whether the local RDR application 308 requests the "new user" category of service, at step 404. The files which were produced at the local site describing the hardware configuration, the user information, and the problem description, in steps 410, and 412, are copied to the Remote Data Recovery Facility for further analysis and addition to a registered user database, in step 1230. If it is determined that it is not feasible to proceed with Remote Data Recovery at the present time, at step 1234, a menu is presented and a time to proceed with the Remote Data Recovery process is negotiated, at step 1238.

At such a time that a previously negotiated RDR procedure were to commence, the local RDR application 308 requests the "pre-registered user" category of service from the RDR Communications Server application at step 1235. Such calls are then authenticated against the registered user database, at step 1240. Non-authentic calls are terminated. As individual communications connections are established, and progress through the various stages illustrated in FIG. 12, the state of progress may be described on the operator's console of the Communications Server 68 in a Communication Channel Status window 2310, for example as is shown in FIG. 23.

If the "new user" service was permitted to proceed with the RDR procedure immediately, in step 1234, or alternatively, upon successful authentication of a pre-registered user, in step 1240, an RDR diagnostic process is performed in step 1250. The diagnostic process is described in detail in reference to FIG. 14. A custom legal agreement describing the terms of any proposed data recovery service is produced and then offered to the operator of the local RDR computer 20, in step 1260. The transmission and prosecution of the legal agreement is described in detail in FIG. 15. Should the operator of the local RDR computer 20 agree to the terms of the agreement, as determined at step 1270, then the Remote Data Recovery procedure is performed, in step 1280. The Remote Data Recovery procedure is described in detail in reference to FIG. 16.

Figure 13:
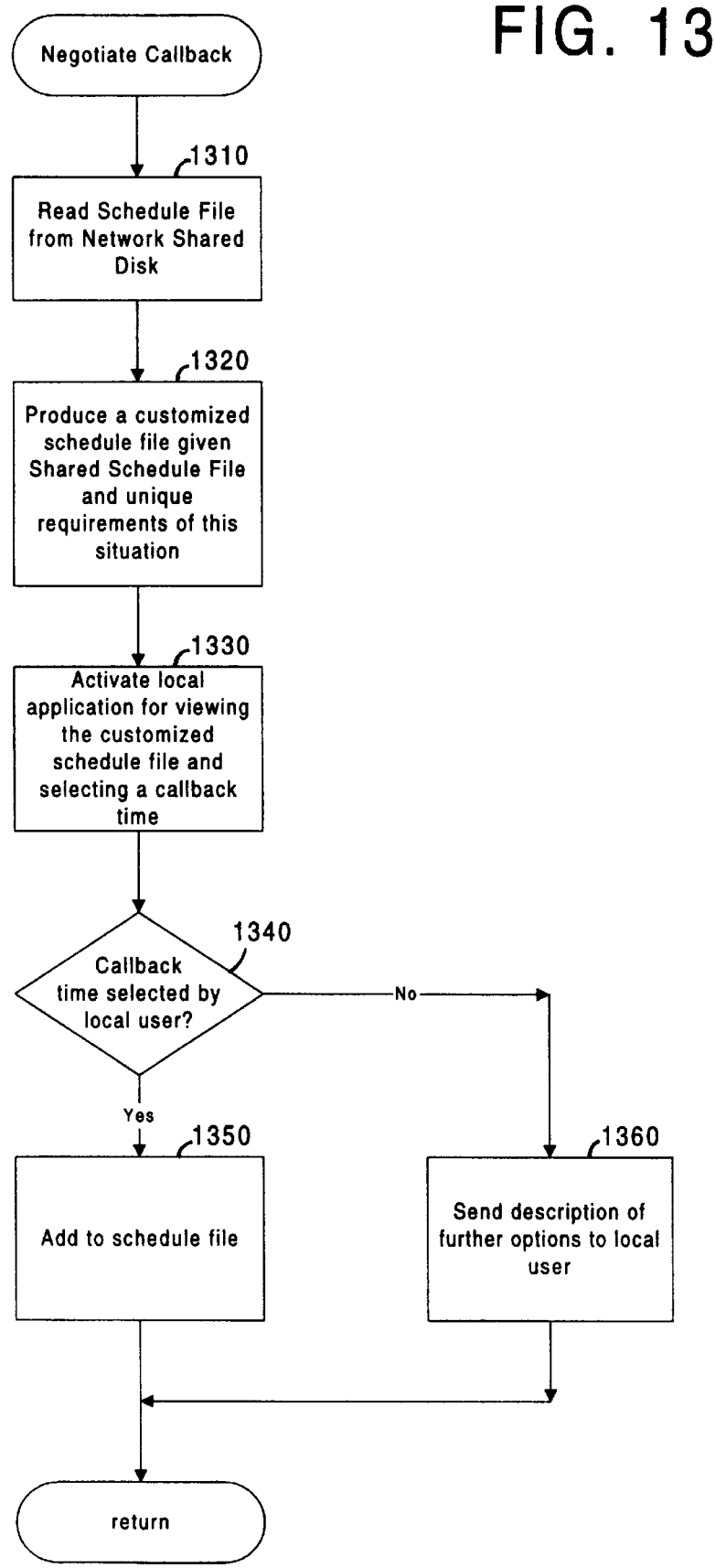
FIG. 13 is a flow diagram of a portion of the RDR Communications Server application of an embodiment of the present invention which facilitates negotiation of a callback time with the user of the local computer.

The flow diagram of FIG. 13 describes the portion of the RDR Communications Server application which is invoked if, for whatever reason, it was determined that the data recovery process should take place after the initial registration phone call, at step 1234. A file which maintains the schedule and resides on the Network Shared Data Storage 64 of the File Server 60 is read at step 1310. This file is then processed at step 1320 with the needs of this particular data recovery situation at hand, to determine a list of appropriate schedule times for processing the RDR process. Such factors as estimated time to perform the recovery, specific technician availability and other prioritization factors may be used to produce this customized list of appropriate times for providing the Remote Data Recovery Service. An application is activated at the local computer, at step 1330, which then enables viewing the customized schedule list, and, optionally selecting a mutually agreeable time for proceeding with the Remote Data Recovery. If such a time is chosen in step 1340, it is added to the schedule file, at step 1350. If no such time was chosen, at step 1340, a description of further options is presented to the operator of the local RDR computer 20, at step 1360. The options presented in step 1360 may include sending the equipment in to the Remote Data Recovery Facility for traditional off-site recovery, or, requesting on-site category data recovery services.

Figure 14:
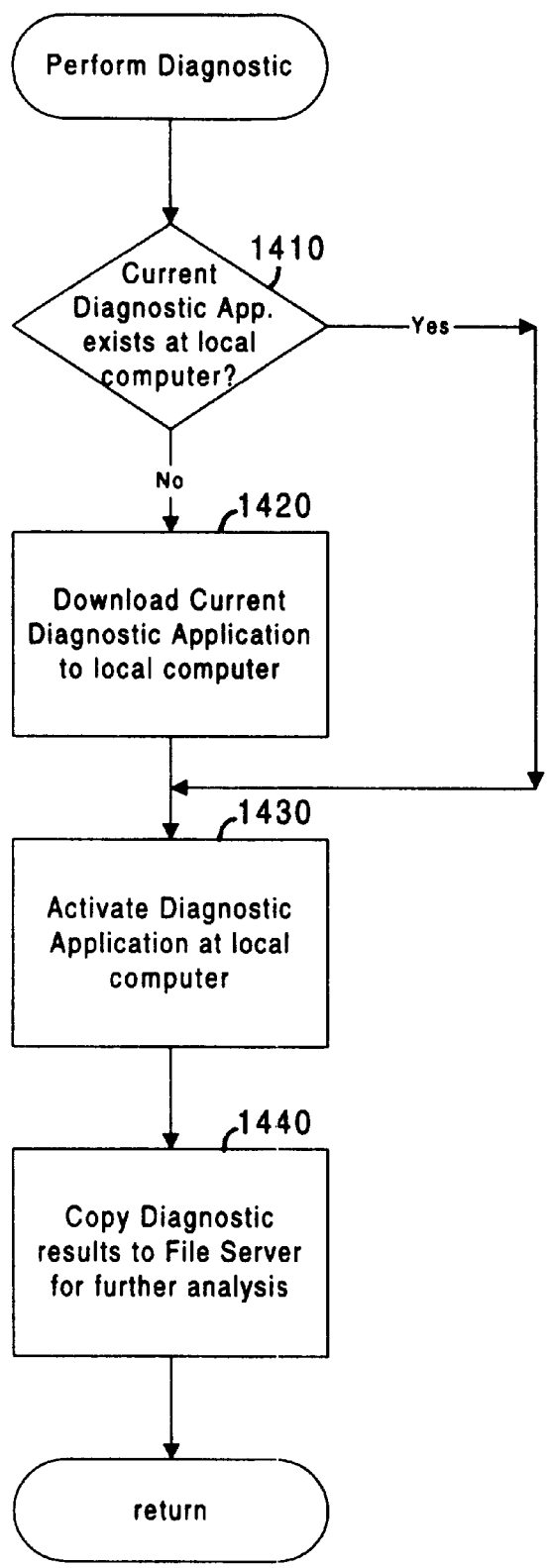
FIG. 14 is a flow diagram of a portion of the RDR Communications Server application of an embodiment of the present invention which downloads to, and causes the execution of the Data Recovery Diagnostic Application at the local computer.

FIG. 14 is a flow diagram of that portion of the Remote Data Recovery Communications Server which facilitates performance of the Data Recovery Diagnostic. A check is first made, in step 1410, to see if a valid copy of the current version of the diagnostic application exists on the distribution media at the local site. If a valid copy of this diagnostic application does not exist or there is no appropriate version of the diagnostic application, an appropriate version of the diagnostic application is downloaded to the local site, at step 1420. Subsequently, or, if the appropriate diagnostic application was determined to exist in step 1410, the diagnostic application is activated at the local computer, in step 1430. The diagnostic application performs diagnosis of the data recovery situation and places results in a file at the Communications Server 68, in step 1440, for further analysis by the remote technician and/or other applications at the Remote Data Recovery Facility.

Figure 15:
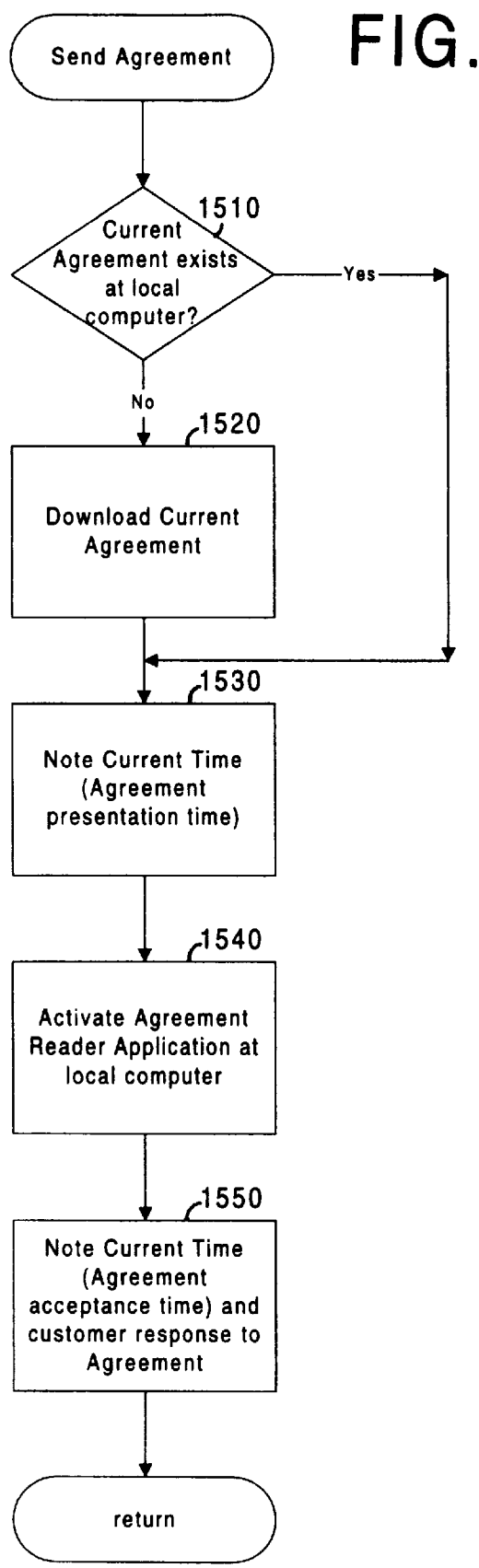
FIG. 15 is a flow diagram of a portion of the RDR Communications Server application of an embodiment of the present invention which downloads a legal agreement to, and causes the execution of the Agreement Reader Application at the local computer.

FIG. 15 is a flow diagram of the portion of the Remote Data Recovery Communications Hardware application which facilitates the presentation, and optional acceptance by the operator of the local RDR computer 20, of a legal agreement. First, a check is made, in step 1510, to see if a valid copy of the current version of the legal agreement exists on the distribution media at the user site. If the legal agreement does not exist or it is not an appropriate version, an appropriate version of the legal agreement is downloaded to the local site, at step 1520. Following downloading 1520, or, a determination that the appropriate legal agreement is in place at step 1510, the current date and time are noted, at step 1530. An Agreement Reader application is then activated at the local RDR computer 20, at step 1540. The Agreement Reader application allows the operator of the local RDR computer 20 to inspect the legal agreement, and optionally accept the terms included therein. The accept/decline response made by the operator, and the current date and time are again noted, at step 1550. Having accurate knowledge of the date and time of agreement presentation and agreement acceptance may be relevant factors in resolving any possible disputes which may arise regarding contested agreements.

Figure 16:
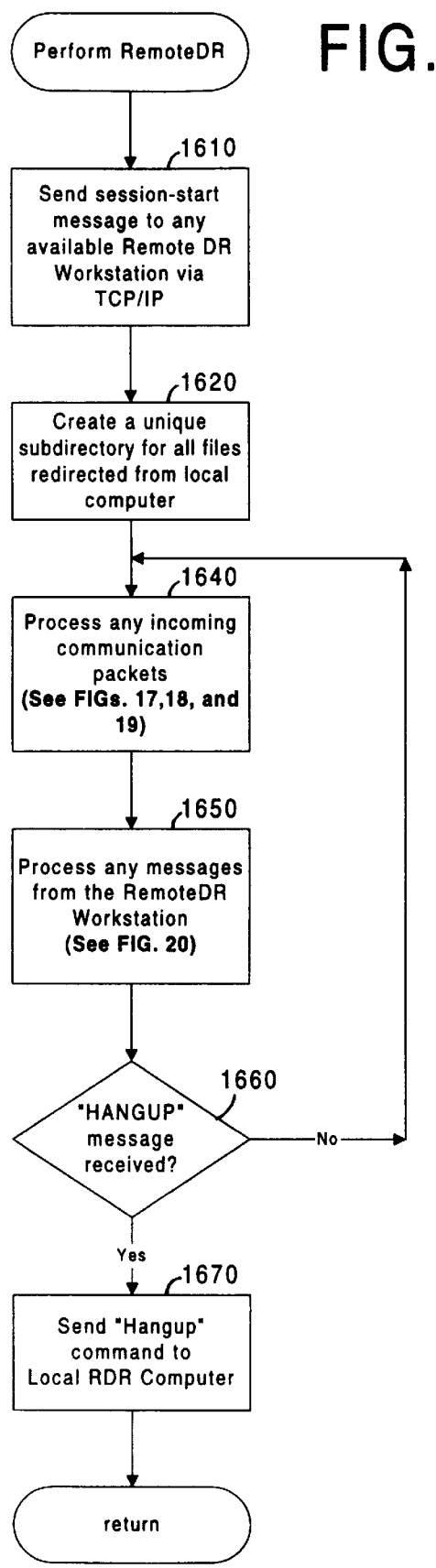
FIG. 16 is a flow diagram of a portion of the RDR Communications Server application of an embodiment of the present invention which establishes a logical connection between the local computer and an appropriate RDR workstation, and maintains said logical connection.

FIG. 16 is a flow diagram of the portion of the Remote Data Recovery Communications Server application which performs the Remote Data Recovery. This process is accomplished by enabling the technician, operating an RDR workstation 40, to remotely control the local RDR computer 20. A logical connection is formed, at step 1610, via TCP/IP with an arbitrary RDR workstation 40 which is available to perform a Remote Data Recovery procedure. Additionally, a unique subdirectory for this session of Remote Data Recovery is created, at step 1620, on the Network Shared Data Storage 64 of the File Server 60. This unique subdirectory is the repository for any session-unique files created by the operator of the local RDR computer 20, as well as any log files which the RDR Communications Server application or the RDR workstation 40 may wish to create. A loop, steps 1640–1660, is then entered which processes any communications packets from the local RDR computer 20, at step 1640, as well as any TCP/IP messages from the RDR workstation 40, at step 1650. If no "hang-up" message is determined to have been received from the RDR workstation 40, in step 1660, then the loop persists. Eventually, the RDR workstation operator causes a "hang-up" message to be sent which breaks the loop, at step 1660, and causes a "HANG-UP" command to be forwarded to the local RDR computer 20, at step 1670.

Figure 17:
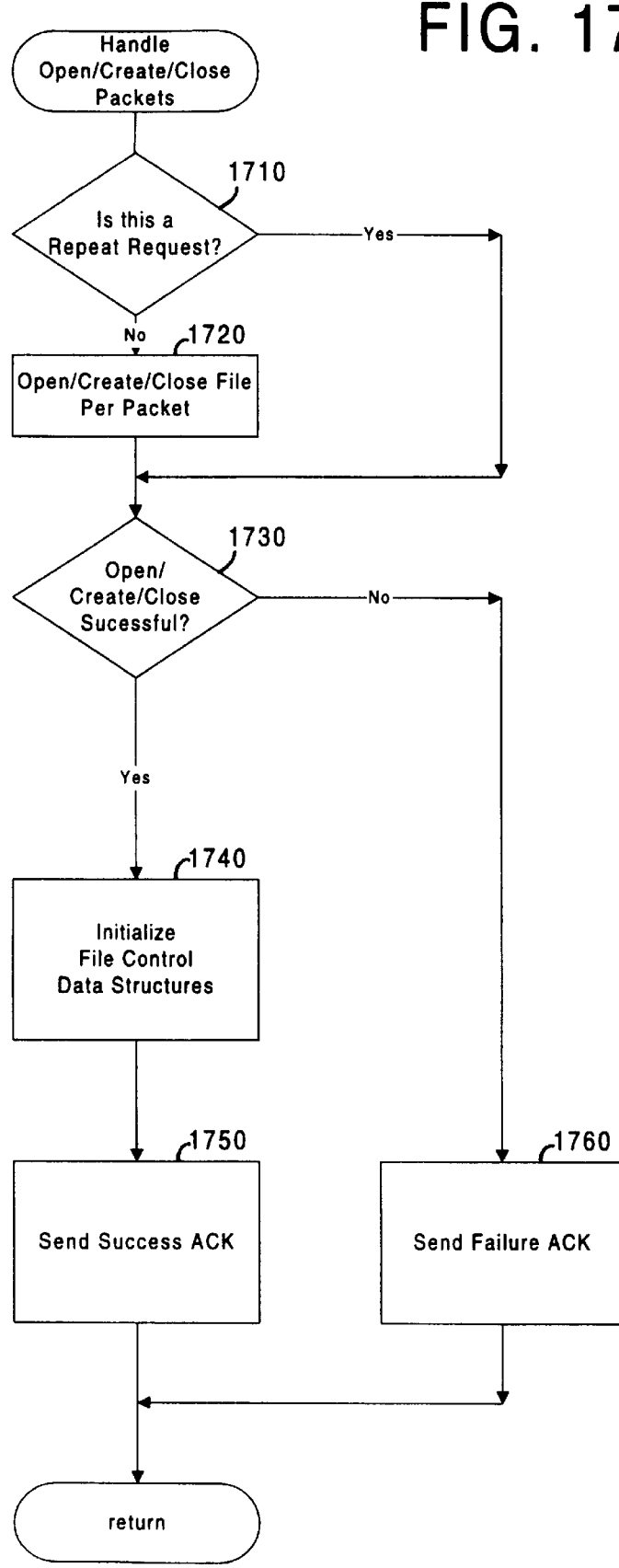
FIG. 17 is a flow diagram of a portion of the RDR Communications Server application of an embodiment of the present invention which handles File Open/Create/Close request packets from the local computer.

FIG. 17 is a flow diagram of the portion of the RDR Communications Server application which responds to packets arriving from the local RDR computer 20 over the network communications hardware unit 69 which request a remote file to be opened, created, or closed. The packet contains a file index which ranges from 0 to the maximum number of concurrently open files, and a sequence number which is utilized to distinguish this request as a unique use of the file index. It is therefore possible to utilize the combination of file index and sequence number to determine if this is a unique request, or if this is a retry of a request for which the acknowledgment was lost due to an error in the communications channel 35. If it is determined that this is not a repeat of a prior request, at step 1710, the file is opened/created/closed per the remainder of the packet, at step 1720. If the request is indeed a repeat request, as determined at step 1710, then the file actual open/create/close is bypassed. If the open/create/close request is not successful, as determined at step 1730, a Failure Acknowledgment is transmitted, at step 1760. Alternatively, if the determination, at step 1730, is that the open/create/close request was successful, then the File Connection Data Structures are initialized within the Remote Data Recovery Communications Server, at step 1740, per the open/create/close request packet and then a Successful Acknowledgment is sent, at step 1750.

Figure 18:
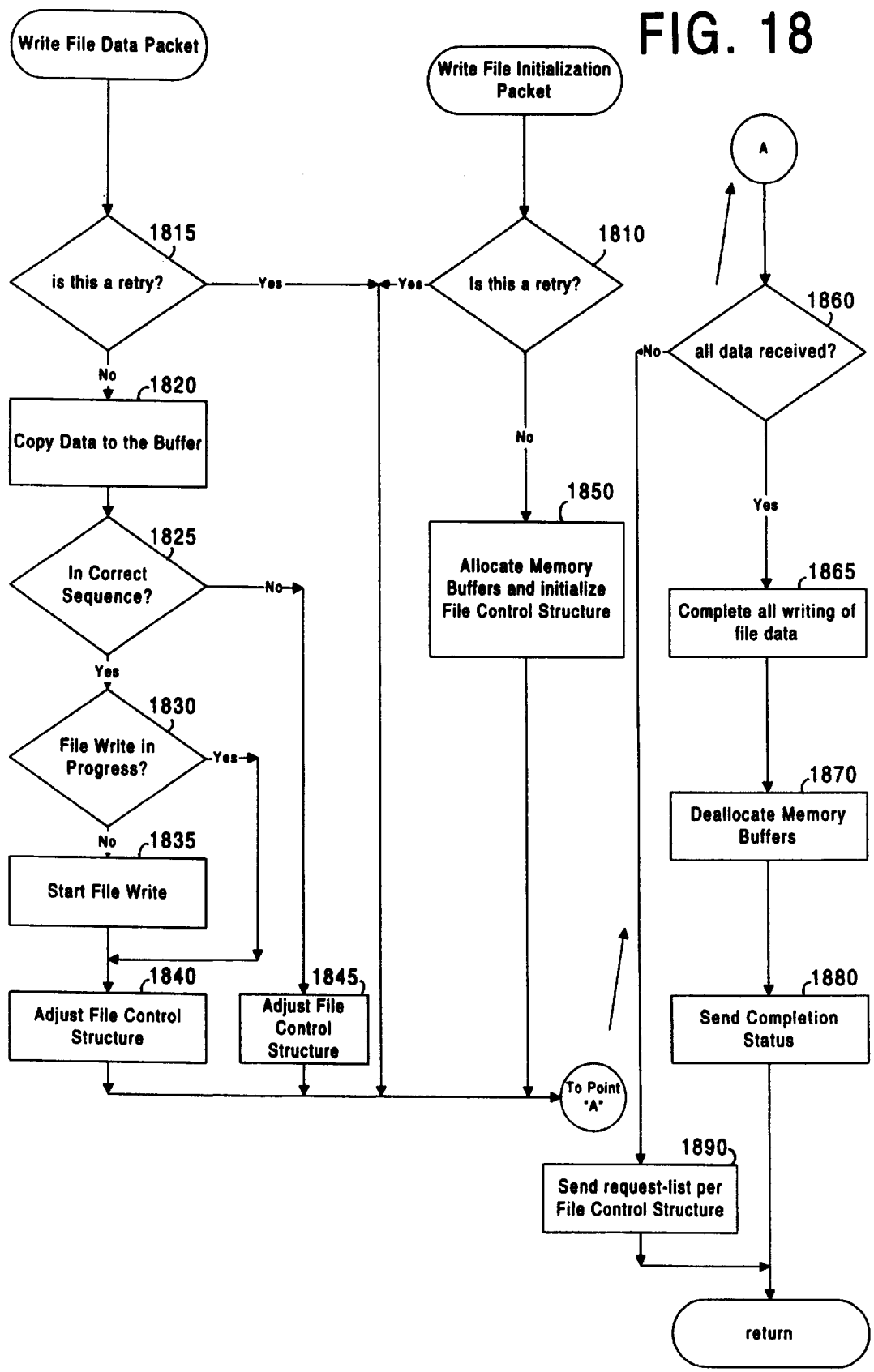
FIG. 18 is a flow diagram of a portion of the RDR Communications Server application of an embodiment of the present invention which handles File Write request data packets from the local computer.

FIG. 18 is a flow diagram of the portion of the RDR Communications Server application which responds to those packets arriving from the local RDR computer 20 over the network communications hardware unit 69 which request File Write activity. The first packet received is a Write File Initialization Packet, which is checked against the sequence number of the last activity on the file to see if it is a retry of a previously received request, at step 1810. If it is determined that this is not a retry, at step 1810, initialization, including allocation of memory for the activity as well as preparation of the initial file control structure 2620 is performed, at step 1850. If it is determined not to be a retry, at step 1810, then initialization has already been performed but the acknowledgment was lost due to communications errors, and so the initialization is skipped. In either case, flow proceeds to point A of FIG. 18, which is the beginning of the algorithm which determines how to respond to a File Write Packet. A test is made, at step 1860, to determine if all write data has been received to satisfy the entire Write File Initialization Packet. If all data has been received, any data which remains in memory buffers is actually written to the file, at step 1865. The memory which was allocated at step 1850 is now de-allocated at step 1870, and a null request list is sent at step 1880 to indicate that the file write is complete. If, during the test at step 1860, it was determined that there was more file data to be received, an appropriate write request list packet is formulated and sent at step 1890. This request-list requests those file data segments for which data has not yet been received and for which there is available buffer space which currently does not contain any unwritten data.

As File Write Data packets arrive in response to File Write Data Request packets, a decision is made, at step 1815, as to whether this is a retry or not, based on the sequence number in the packet. If it is a retry, then processing continues at Point A. If it is determined not to be a retry, then the packet data is copied, at step 1820, to the buffer which was allocated at step 1850. If the segment number is determined not to be in the appropriate sequence, at step 1825, then the request-list is adjusted, at step 1845, to cause a re-request of any segment(s) which was/were not received. If the segment is determined to be in sequence, at step 1825, as is the case in the absence of communications errors, a test is made, at step 1830, to see if file write activity is currently taking place. If there is no file write activity, then a file write is initiated, at step 1835, of any data buffers which contain unwritten file data. The request-list is then adjusted, at step 1840, to take into account those file segments received thus far, as well as any file data buffers which are now free to receive more data. Processing then continues at Point A.

Figure 19:
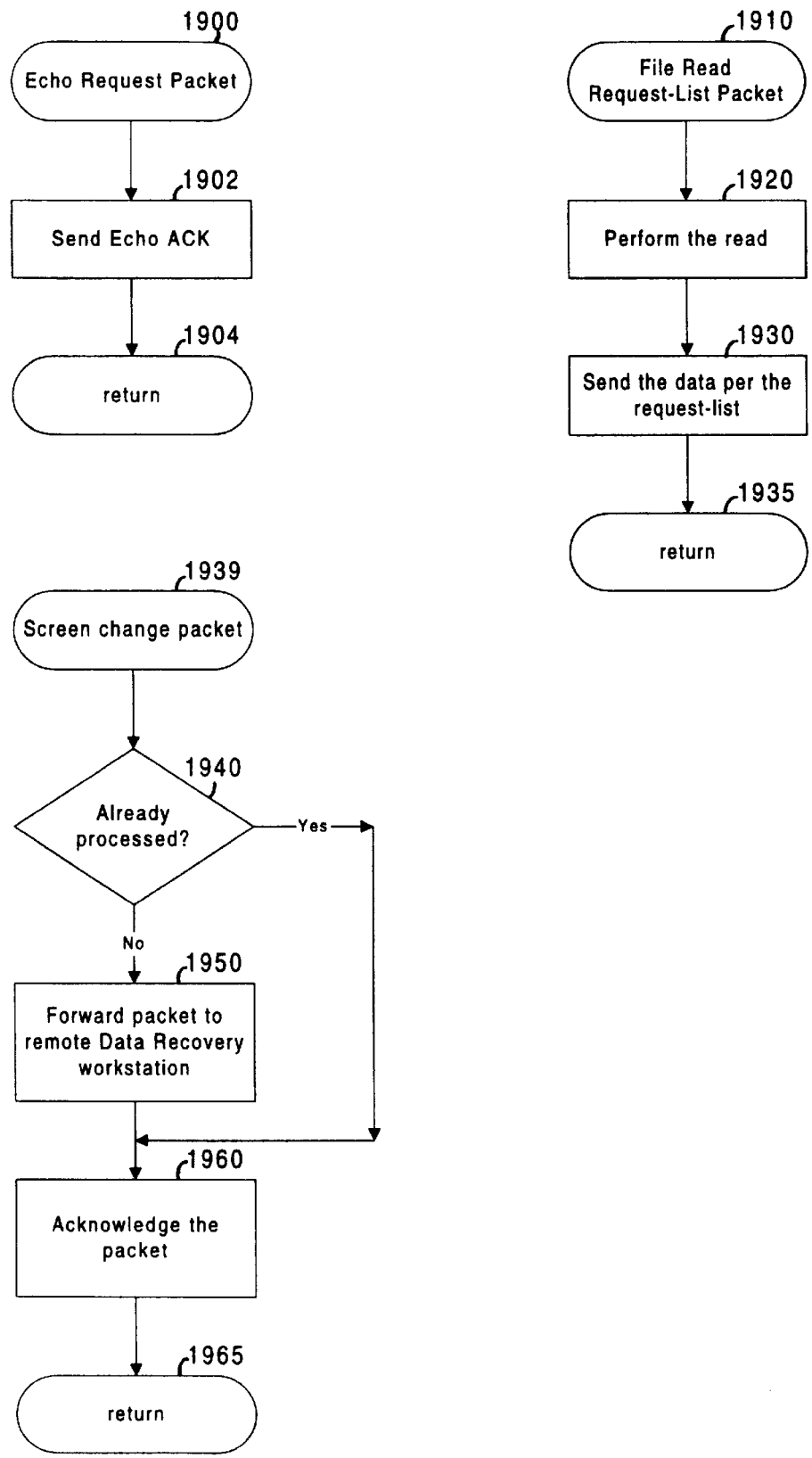
FIG. 19 is a flow diagram of a portion of the RDR Communications Server application of an embodiment of the present invention which handles miscellaneous request data packets from the local computer.

FIG. 19 describes various packet handlers which exist in the embodiment of the RDR Communications Server application. Echo Request packets are handled, in the routine commencing at step 1900, by sending an Echo Acknowledgment packet, at step 1902, which-contains a copy of any optional Echo Data which was in the original Echo Request packet. File Read Request List packets contain a list of segments of the file for which the local user is ready to receive data. These File Read Request List packets are handled by the routine starting at step 1910, by performing the actual read, at step 1920, and then sending the data, at step 1930, in the form of File Read Data packets. Screen Change Packets, handled by the routine starting at step 1939, are tested, at step 1940, to see if they are retries of a packet already processed. This test, as with many other packets, is performed by virtue of the sequence number contained within the packet. If the packet is determined not to be a retry, at step 1940, it is then processed, at step 1950, by forwarding to the Remote Data Recovery Workstation via a TCP/IP connection. Following this action, or, if the packet was determined to be a retry, a Screen Change Acknowledgment packet is sent, at step 1960, to the local RDR computer 20.

Figure 20:
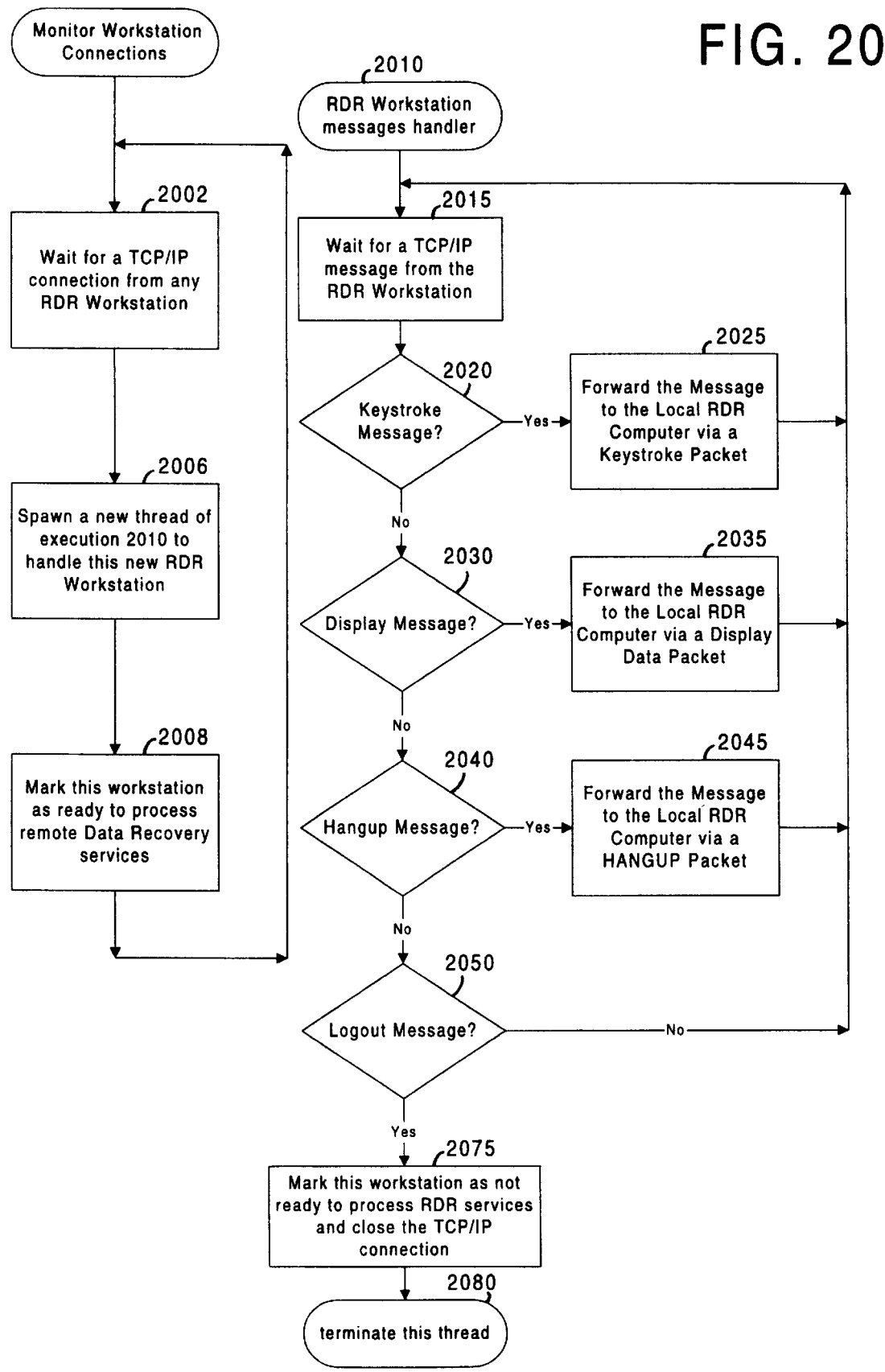
FIG. 20 is a flow diagram of the portion of the RDR Communications Server application of an embodiment of the present invention which handles TCP/IP messages from the RDR workstation computer.

FIG. 20 is a flow diagram representing a thread of execution, steps 2002–2008, which operates continuously within the RDR Communications Server Application for monitoring Remote Data Recovery Workstation connections, and a thread of execution which continuously handles messages from RDR workstations 40 while they are actively involved in remote data recovery operations.

The connection monitor thread, steps 2002–2008, monitors a TCP/IP port which is known to all RDR workstations 40 on the system. The RDR Communications Server application waits, at step 2002, for any RDR workstation 40 to establish a TCP/IP connection. Therefore, any RDR workstation 40 which activates its RDR workstation application, discussed later in reference to FIG. 21, establishes a logical connection via this port. Once a TCP/IP connection is established on this port, another thread of execution is spawned, at step 2006, which handles messages from the RDR workstation 40. The RDR workstation 40 thus connected is noted, at step 2008, as being capable of processing remote data recovery service. Those RDR workstation connections so noted at step 2008 may be described on the operator's console of the Communications Server 68 in a Workstation Status window 2320 as shown in FIG. 23.

The thread, steps 2010–2075, which is spawned, at step 2006, as a result of the TCP/IP connection, is responsible for handling all TCP/IP messages sent by the RDR workstation 40. A separate thread of this sort exists within the RDR Communications Server application for all RDR workstations 40 which are currently established as potential providers of remote data recovery service. These threads begin receiving messages as the operator of the RDR workstation 40 performs activity in the performance of remote data recovery.

Specific TCP/IP messages are generally handled by forwarding these messages to the local RDR computer 20 via various packets over the communications hardware. TCP/IP messages which represent keystrokes are detected, at step 2020, and forwarded, at step 2025, to the local RDR computer 20 as Keystroke packets. TCP/IP messages which represent Display Messages are detected, at step 2030, and a forwarded, at step 2035, to the local RDR computer 20 as Display Data packets. Similarly, a "HANG-UP" TCP/IP message is detected, at step 2040, and forwarded, at step 2045, to cause the local RDR computer 20 to hang-up the telephone connection. The remaining TCP/IP message type is the "LOGOUT" message, which occurs as the result of the RDR Workstation operator exiting the RDR Workstation application. When the "LOGOUT" message is detected, at step 2050, it causes the RDR Communications Server application to note, at step 2075, that this RDR workstation 40 is no longer ready to process remote data recovery services. The TCP/IP connection is then closed and this thread of execution terminates, at step 2080.

Figure 21:
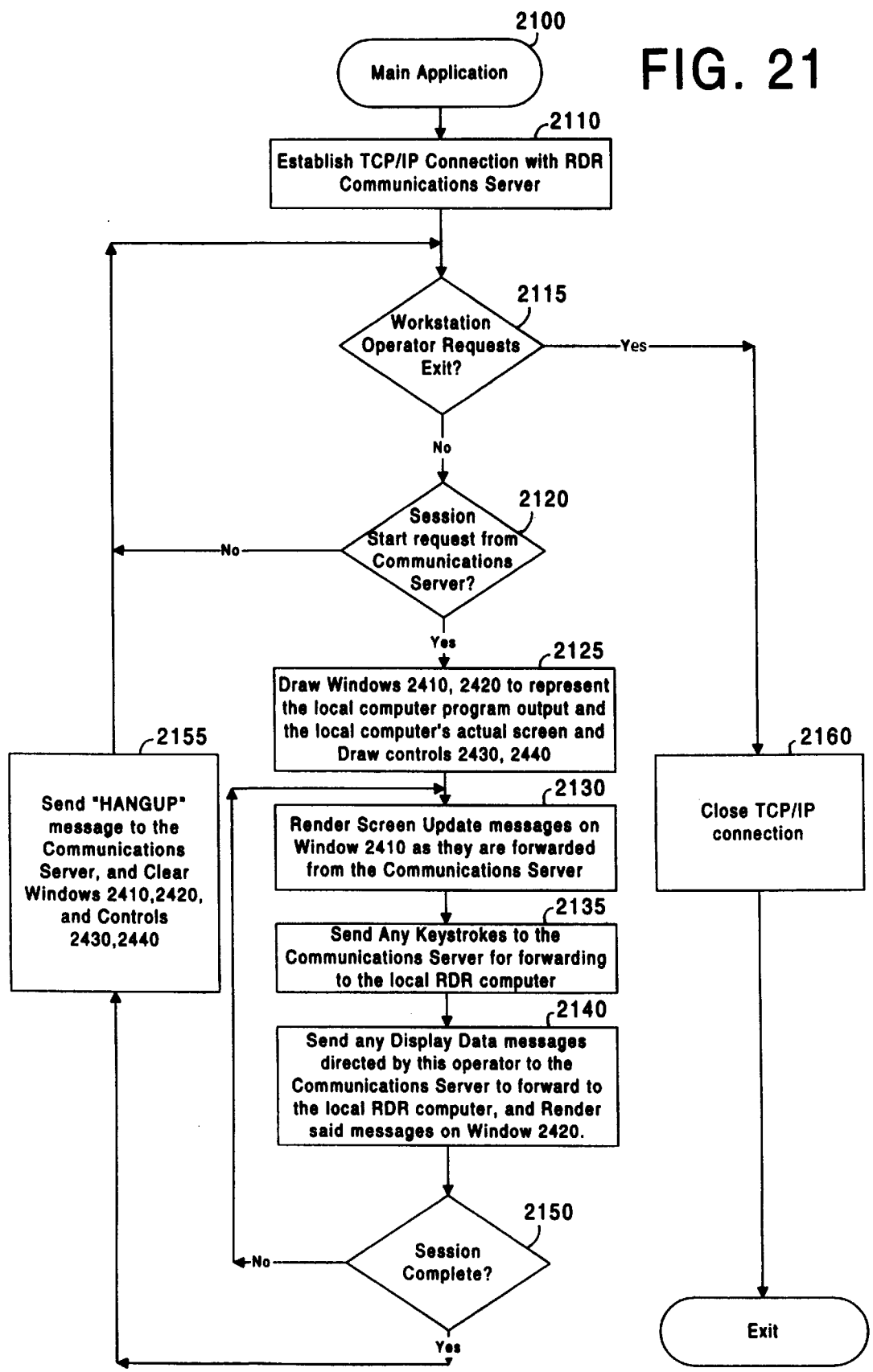
FIG. 21 is a flow diagram of the RDR Workstation main application of an embodiment of the present invention.
Figure 24:
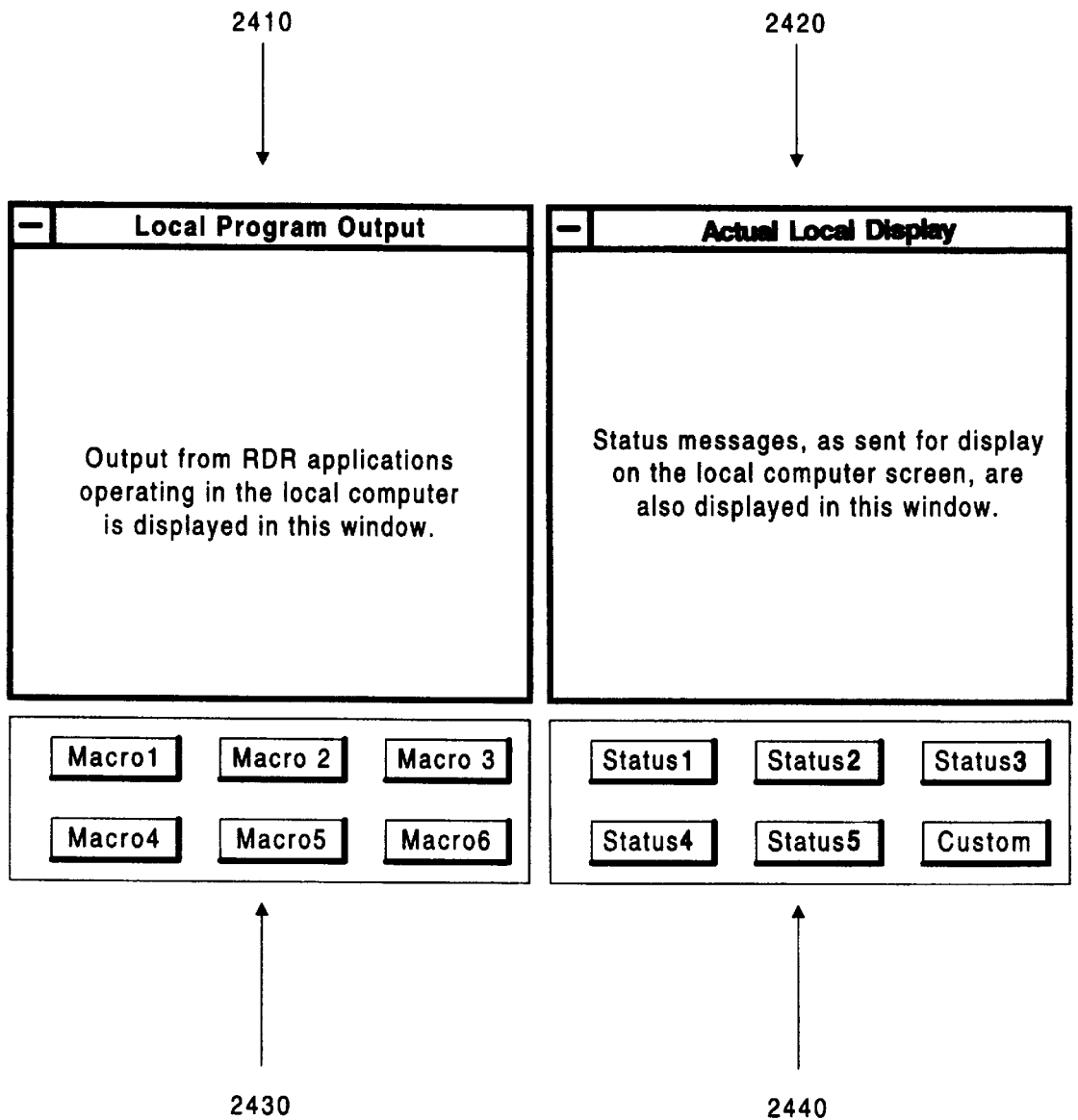
FIG. 24 illustrates computer screens which allow the user of the Remote Data Recovery Workstation to control and to monitor output from programs of the Remote Data Recovery local computer, and to control and to monitor the appearance of the actual screen of the Remote Data Recovery local computer.

FIG. 21 is a flow diagram representing the overall operation of the application which controls the RDR workstation 40. Upon invocation of the RDR workstation application, at step 2100, a logical connection is established, at step 2110, with a RDR Communications Server application via a pre-determined, fixed TCP/IP port on the RDR Communications Server 68. A loop, steps 2115–2120, is then entered which waits until either the Workstation Operator requests that the application be exited, at step 2115, or, a TCP/IP message arrives, at step 2120, from the RDR Communications Server application requesting the start of a Remote Data Recovery session. The Communications Server 68 issues a TCP/IP request to start a Remote Data Recovery session at step 1610. This request 1610 is detected by the RDR workstation 40, at step 2120, and a collection of windows 2410, 2420 and controls 2430, 2440 are drawn on the RDR workstation console 44, as illustrated in FIG. 24.

The macro control buttons 2430 are provided to allow a "macro" capability, such that activation of any individual button issues the equivalent of multiple, pre-configured keystrokes. The status control buttons 2440 are provided to allow the capability of specifying status messages for display on the RDR local computer console 24.

At step 2130, any screen update messages which have been sent by the local RDR computer 20 at step 1170, subsequently forwarded by the Communications Server 68 at step 1950 and received via TCP/IP are rendered on window 2410. Thus, window 2410 shows all screen activity performed by those Data Recovery Application Programs 300 operating at the local RDR computer 20.

At step 2135, any keystrokes from the RDR workstation keyboard 42 are sent via TCP/IP to the Communications Server 68 for forwarding 2020, 2025 to the local RDR computer 20 as keystroke packets. These keystroke packets are received by the local RDR computer 20 as shown at steps 750 and 755 in FIG. 7, thus allowing the operator of the RDR workstation 40 to control the Data Recovery Application Programs 300 operating at the local RDR computer 20.

At step 2140 any Display Data messages which were specified via the activation of control buttons 2440 are sent via TCP/IP to the Communications Server 68 for forwarding 2030, 2035 to the local RDR computer 20 as Display Data packets. The local RDR computer 20 handles these packets by copying them to the local-screen at step 742. Additionally at step 2140, these Display Data messages are rendered on the window 2420, such that the window 2420 maintains an accurate representation of the appearance of the local RDR computer console 24.

When, at step 2150, it is determined that the session is complete, a "HANG-UP" message is sent to the communications server 68 and the windows 2410 and 2420 and controls 2430 and 2440 are cleared, at step 2155.

FIG. 22 contains depictions of computer screens representing forms displayed on the local display 24 which the user of the local RDR computer 20 may fill in to provide information regarding the identity of the user, the nature of the present data loss situation and the corresponding service desired. User identification and other relevant information is ascertained by the form 2210. Information relevant to the proper diagnosis of the data loss and relevant to describing the desired service is ascertained by the user filling out form 2220.

FIG. 23 contains depictions of computer screens displayed by the communications server application which provide the administrators of the Remote Data Recovery Facility to manage the communications server 68. A Communication Channel Status Window 2310 is provided to facilitate monitoring of the status of each configured LAN communication channel 66. Each LAN communication channel 66 may be in a waiting mode, a guest mode, a new user mode, an active data recovery mode, or may be off-line. Additional controls may be provided to facilitate maintenance and configuration of individual LAN communication channels 66 or the communications server 68 as a whole. Additionally, a Workstation Status Window 2320 is provided to allow monitoring of those Remote Data Recovery Workstations 40 which have established TCP/IP connections to the Communications Server 68, and an indication as to the current activity being performed at those Remote Data Recovery Workstations 40.

FIG. 24 contains depictions of computer screens which can be displayed on the RDR workstation display 44. These screens allow the user of the RDR workstation 40 to control and to monitor output from programs of the local RDR computer 20, and to control and to monitor the appearance of the actual screen of the local RDR computer display 24. The Local Program Output window 2410 is a display of the output of all RDR applications 300. This output enables the operator of the RDR workstation 40 to monitor the applications running on the local RDR computer 20. The macro control buttons 2430 provide methods for the operator of the RDR workstation 40 to send frequently-used keystroke sequences to the local RDR computer 20. Use of the status control buttons 2440 allows the operator of the RDR workstation 40 to cause pre-configured or custom status messages to be displayed on the local RDR computer display 24. The Actual Local Display window 2420 then is a display which follows the content of the local RDR computer display 24. This allows the operator of the RDR workstation 40 to remain aware of the status messages which have been displayed.

FIG. 25 contains descriptive drawings of data structures utilized in an embodiment of the local RDR application 300. Diagram 2510 describes an Outgoing Packet Descriptor (OPD) data structure. This OPD 2510, and any OPD's which are linked via the link list pointer 2511, comprise the transmission queue within the Communications subsystem code 318 of the local RDR application 308. The remainder of the data structure consists of pairs of Fragment Length fields 2512 and Fragment Pointer fields 2514. Any number of such pairs of Fragment Length fields 2512 and Fragment Pointer fields 2514 may exist, until a pair with a zero Fragment Length field is encountered 2516, which terminates the list of pairs. Each pair describes a region of memory which comprises a portion of the outgoing packet. This is a classical "gather-write" approach which allows the collection of various portions of the outgoing packet to be collected from widely separated regions of memory.

Diagram 2520 illustrates a local File Control Structure (local FCS). One such local FCS 2520 exists for every potentially concurrent instance of an open remote file within the Local Remote Data Recovery application 308. Further insight into the use of this data structure can be gained by referencing the flow diagrams of FIGS. 7, 9, and 10 as well as the detailed descriptions associated with those flow diagrams. The local FCS 2520 contains a Status Field 2522 which represents the current state of the file, as currently open, currently closed, or in some intermediate state as communications occur. The Sequence Number Field 2524 is altered prior to the initial communications for every remote file read, write, open, create, or close attempt. As such, the Remote Data Recovery Communications Server 68 can determine whether such requests are new requests or retries of requests for which the response was lost due to a communications error. Retries are counted on a per-request basis with the Retry Count Field 2526, such that a limited number of retries can be attempted before an operation is aborted. The Current File Pointer field 2528 is utilized to maintain a record of the offset in the file as used for stream operations. In order to protect against requests or acknowledgments which are lost due to communications errors, a Time Out Field 2530 exists to allow determination of whether sufficient real time has elapsed between the request and any response to that request. Whenever sufficient time has elapsed, it is then assumed that either the request or the response to that request has been lost.

During file read operations, a Read Request List packet is sent to request those file segments which are desired but not yet received. Files are transferred on the basis of quantum units called segments, the segment being a fixed size sequential fragment of the file. Any file data transfer packet contains at most one segment. The fixed size of the segment is predetermined by the programmer, and is based on computational convenience, file system performance, and in consideration of the resulting packet size. The Request List is created with an initial segment value equal to the Next Segment To Be Received 2532, and requests as many sequential segments as possible without overrunning the Total Segments Left to Receive Field 2534. Any segments which are received out of sequence are discarded and immediately cause a revised Read Request List to be created and placed in the transmission queue at step 766 of FIG. 7. Also, any timeout condition causes a revised Read Request List to be created and placed in the transmission queue at step 1030 of FIG. 10.

During file write operations, a Write Initialization packet is sent, the Write Initialization packet including a starting segment number and a total byte count. This packet allows the Communications Server 68 to request file segments as the Communications Server's buffering and I/O subsystems becomes ready to receive file segments. The Communications Server 68 makes such requests for file segments by sending File Write Request List packets, which are processed at step 712 of FIG. 7. The data structure fields First Segment Requested 2536 and Segment Count Requested 2538 are taken directly from the File Write Request List packet. File Write Data packet(s) are then placed in the transmission queue. The Next Segment To Send field 2540 is utilized to determine which file segment to start placing in the queue. As long as the Next Segment To Send is within the range described by the First Segment Requested and the Segment Count Requested it is assumed that any difference between Next Segment To Send 2540 and First Segment Requested 2536 is due to packets which are in transit. Receipt of a File Write Request List packet with a null request is interpreted as successful completion of the file write operation.

Diagram 2560 describes Screen Line Change Descriptor (SLCD) data structures used to keep track of which portions of the virtual screen written to by RDR applications 300 have not yet been successfully transmitted to the RDR Communications Server 68. There exists within the SLCD a pair of fields, the First Dirty Column 2562 and the Last Dirty Column 2564, for each line of characters on the screen. This pair of fields describes the inclusive range of columns which contain modified but as yet untransmitted data.

FIG. 26 contains descriptive drawings of further data structures utilized in an embodiment of the local RDR application 308 as well as descriptive drawings of data structures utilized in an embodiment of the RDR Communications Server application.

The data structure described in FIG. 26 at 2610 is the Packet Receive Control (PRC) structure. The PRC is utilized by the RDR local application 308 to decode incoming packets, maintain statistics, and transfer control to the routines of FIG. 7, which are responsible for handling each specific type of incoming packet. The Pointer Link to Next Packet Receive Structure field 2612 is utilized to maintain a collection of such structures in a classic singly linked list. The Packet Type Number field 2614 is matched against the type field of incoming packets, and determines whether this packet should be handled in accordance with this PRC or a subsequent PRC. If the Packet Type Number field is equal to the type field of the incoming packet, the Packet Counter field 2616 is incremented to maintain statistics, and the software routine pointed to by the Pointer to Packet Handler Routine field 2618 is called to handle the processing of the incoming packet.

The data structure 2620 is the File Control Structure (FCS) as utilized within the RDR Communications Server 68. One Server FCS 2620 exists for every potentially concurrent instance of an open remote file within the RDR Communications Server application. Further insight into the use of this data structure can be gained by referencing the flow diagrams of FIGS. 18 and 19 as well as the detailed descriptions associated with those flow diagrams. The Server FCS 2620 contains a Status Field 2622 which represents the current state of the file, as currently open, currently closed, or in some intermediate state as communications occur. The Last Sequence Number Field 2624 is checked on every remote file read, write, open, create, or close attempt. As such, the RDR Communications Server application can determine whether such requests are new requests or retries of requests for which the response was lost due to communications error. Retries are counted on a per-request basis with the Retry Count Field 2626, such that a limited number of retries can be attempted before an operation is aborted. In order to protect against requests or acknowledgments which are lost due to communications errors, a Time Out Field 2630 exists to allow determination of whether sufficient real time has elapsed between the request and any response to that request. Whenever sufficient time has elapsed, it is then assumed that either the request or the response to that request has been lost. As files are created, or opened, the Actual File Handle field 2636 is used to hold the actual file handle utilized by the system for referencing this file in future read, write, or close requests.

During file read operations, Read Request List packets are responded to by merely performing the actual file read as specified in the request list and subsequently sending the requested file data as File Read Data packet(s). Should a Read Request List packet arrive while File Read Data packets are being sent, it should be assumed that a packet was lost due to communications error, and the prior sequence of File Read Data should be halted and the new Read Request List should be honored. Relevant fields of the FCS data structure during read operations are the Current File Pointer 2628, First Segment Requested 2632, Segment Count Requested 2634. These fields are filled from the contents of the Read Request List packet, and are adjusted as the associated File Read Data packets are transmitted.

During File Write operations, Write File Initialization packets are received to define the intended write operation. The Write File Initialization packet provides information for the Current File Pointer 2628, First Segment Requested 2632, and Segment Count Requested 2634 fields of the Server FCS 2620. Additionally, memory is allocated per the request and in consideration of system resource utilization. The Number of Free Segment Buffers field 2636, the Total Number of Segments field 2640, and the Pointers to Segment Buffers 2642 are set to reflect the number of segment buffers allocated and their memory location. As Write File Data packets arrive, they are placed into available buffers and scheduled for writing to the file. Arrival of a file segment will decrement the number of Free Segment Buffers 2638, and successful writing of those segments will again increment the number of Free Segment Buffers 2638. File Write Request List packets are formulated by utilizing the First Segment Requested field 2632 as a starting segment number, and the number of requested segments is limited by either the number of Free Segment Buffers 2638 or the Segment Count Requested 2634 fields. First Segment Requested 2632 and Segment Count Requested 2634 fields are incremented and decremented, respectively, as File Data packets arrive, such that they maintain an accurate description of the file data remaining to be received.

It will be appreciated that the present invention may take on many variations of the above described embodiments. The principle of the present invention is to allow diagnosis of data storage devices and/or data recovery by a remote data recovery computer. In some cases, only the diagnosis is carried out remotely, as the user may elect not to proceed with the actual recovery. In some cases, the recovery is performed at the local computer-and the recovered data re-stored on the local user's storage device 26. In many cases, the data may be downloaded to the RDR network shared drives 65, restored, and saved on a new storage media which is then sent to the user and/or picked up by the user. In some cases, damaged data may be downloaded to the RDR network shared drives 65, restored, and then uploaded back to the local RDR computer 20. It will be appreciated that these are but some of the many scenarios that might occur under the principles of the present invention.

It can be appreciated that automated, detailed logging of noteworthy events, including chat conversations, acceptance of legal agreement(s), data recovery applications used, etc. would be of value in analysis of business trends and as reference material for any dispute which might arise from time to time. Therefore, the preferred embodiment of RDR would include a means for logging events such as the following:

1) Connection start: date/time, client job-id and phone number, communications channel type and speed;
2) Data Recovery Diagnostic/Application program start and stop dates/times as well as any reports from said programs;
3) All chat or conversational messages (in both directions);
4) All legal agreements submitted, client response to said agreements, all attachments or supplements;
5) Complete logs of all data sectors modified and their prior state; and
6) Connection termination date/time.

It can be appreciated that the performance of data recovery can involve postulation of hypothesis which may be proven inaccurate as the recovery process continues. Therefore, is desirable to allow the ability to "undo" the modifications performed to the local storage device 26 if such modifications are subsequently determined to have been based on incorrect assumptions or are otherwise inappropriate. In the preferred embodiment, a mechanism is provided to defer all changes to the local storage device until such time as the operator of the RDR workstation makes the decision to continue or, alternatively, abandon said changes. If the decision is made to commit the changes, then all data which is marked for being changed is first transferred to the RDR facility for archival. Only then is the new data actually written to the local storage device 26. The preferred method to implement such a mechanism is with a file which logs all write activity which would be performed on the local storage device 26. The file resides on the network attached storage device 65 at the remote data recovery site. Each entry within the file contains an identifier which identifies the unique sector and local storage device which is represented, as well as the latest data which was written to that sector. It is effectively a "write-cache".

Figure 27:
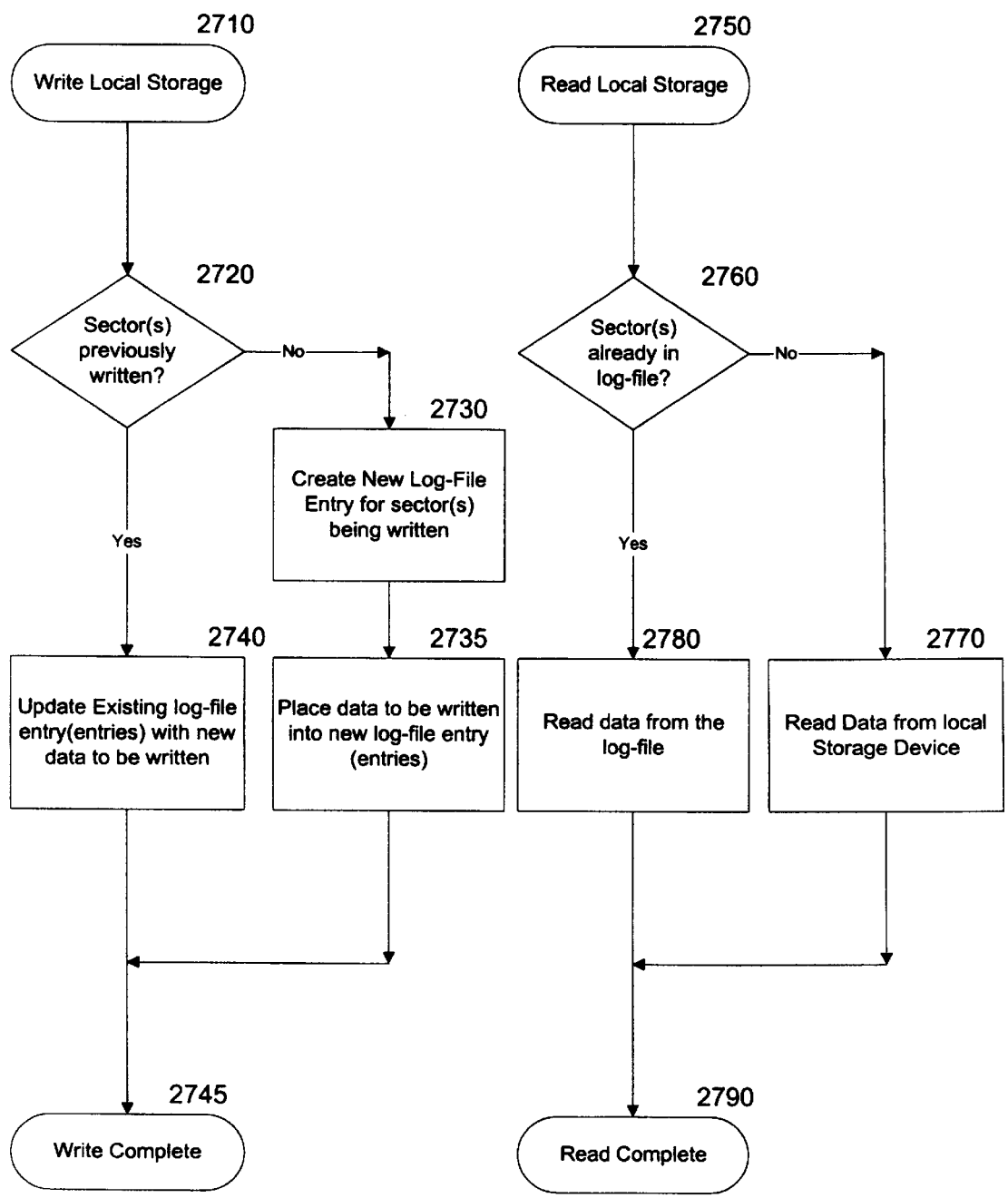
FIG. 27 is a flow diagram of the IO logic layer within the local RDR application 308 which implements the capability of "undoing" any modifications made to the local data storage device 26.

FIG. 27 is a flow diagram of the IO logic layer within the local RDR application 308 which implements the capability of "undoing" any modifications made to the local data storage device 26. All attempts to write to the local storage device 26 enter this IO logic layer at 2710. If the requested sector(s) have not been previously written there will be no existing entry in the log-file. If this condition is detected at 2720, a log-file entry will be added at 2730, and at 2735 the data to be written will be written into the log-file entry. If at 2720, it is detected that the requested sector(s) have been previously written, the existing log-file entry will be updated at 2740 with the new data to be written. There will therefore exist in this log-file an entry and the current data for every sector which has been written during the data recovery session. All attempts to read the local storage device 26 enter this IO layer at 2750. If at 2760 it is determined that the requested sector(s) do not exist in the log-file, i.e. they have not been written during this session, data is read directly from the device at 2770. If at 2760 it is determined the requested sector(s) do exist in the log-file, i.e. the sectors have been written during this session, at 2780 the data is read from the log-file to satisfy the request. This gives the appearance to data recovery application programs 300 that the sectors are indeed being written, but these writes are indeed effectively cached by the log-file.

Figure 28:
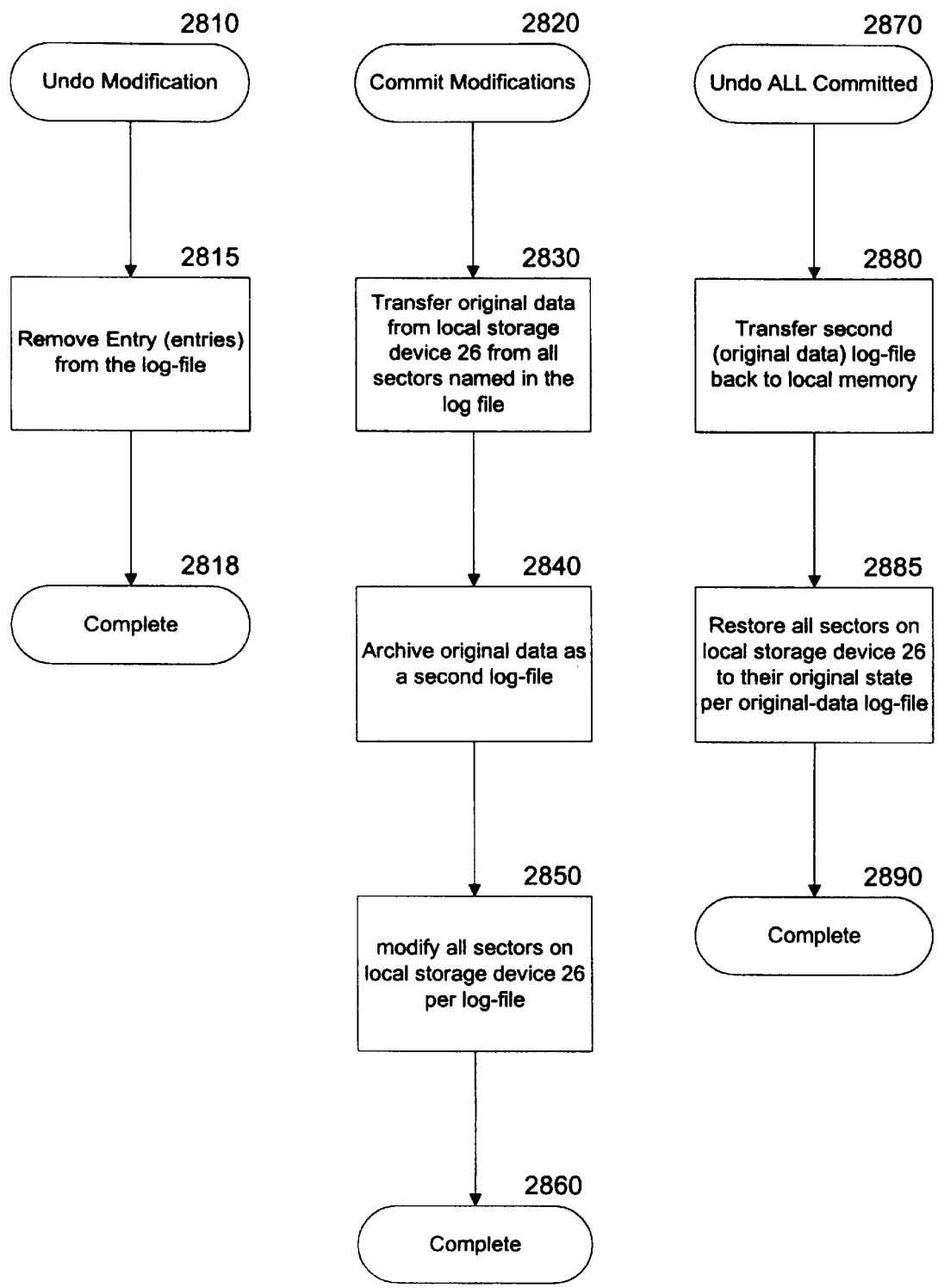
FIG. 28 is a flow diagram of the application which manipulates the log-files to facilitate the abandonment of changes, the committing of the new data, and the potential restoration of original data.

FIG. 28 is a flow diagram of the application which manipulates the log-files to facilitate the abandonment of changes, the committing of the new data, and the potential restoration of original data. Sectors which are decided to have been inappropriately modified can be "undone" at 2810 by removing the corresponding log-file entries at 2815. When it becomes desirable to commit all modifications at 2820, the original data, about to be overwritten, is transferred at 2830 to a file on the network attached storage device 65 at the remote data recovery site. This original data log-file is then archived at 2840. Finally, since the original data has now been safely archived, the log-file data is used to modify the local storage device 26 at 2850. If, for whatever reason, it is deemed appropriate to restore the local storage device 26 to the original state, it is possible to undo all committed changes at 2870. In this case, the original data which was transferred and archived at 2830 and 2840, respectively, is transferred back to the local computer memory at 2880, and all sectors so noted in this original data log-file are restored at 2885 to the local storage device 26, leaving the local storage device 26 in its original state.

It is to be understood, that although numerous characteristics and advantages of the invention have been set forth in the foregoing description, together with details of the structure and function of the invention, the disclosure is illustrative only, and changes may be made in detail, especially in matters of shape, size, and arrangement of the parts within the principles of the invention to the full extent indicated by the broad general meaning of the terms in which the appended claims are expressed.

What is claimed is:

1. A method for remotely recovering data from a storage medium in a local computer having a normal operating system, the method comprising the steps of:

loading into a removable media storage device of the local computer a removable storage medium including a bootable remote data recovery operating program pre-recorded thereon:

loading into memory of the local computer, the bootable remote data recovery operating program from the removable storage medium, the bootable remote data recovery operating program being operated locally by the local computer and independently of the normal operating system;

establishing communications between the local computer and a remote data recovery computer through operation of the remote data recovery operating program by the local computer; and remotely controlling the local computer by the remote data recovery computer, whereupon data on the storage medium of the local computer can be diagnosed and rectified through operation of the remote data recovery computer.

2. A method in accordance with claim 1, further including the step of querying a local computer user for information through operation of the remote data recovery operating program by the local computer prior to establishing communication with the remote data recovery computer.

3. A method in accordance with claim 2, further including the step of querying the local computer user for data recovery information through operation of the remote data recovery operating program by the local computer prior to establishing communication with the remote data recovery computer.

4. A method in accordance with claim 2, further including the step of querying the local computer user for user identifying information through operation of the remote data recovery operating program by the local computer prior to establishing communication with the remote data recovery computer.

5. A method in accordance with claim 1, further including the step of monitoring operation of data recovery programs executing on the local computer via a display at the remote data recovery computer.

6. A method in accordance with claim 5, wherein the step of monitoring includes monitoring the storage medium containing the remote data recovery operating program for data recovery application programs.

7. A method in accordance with claim 1, further including the step of controlling operation of data recovery programs executing on the local computer by a computer input device at the remote data recovery computer.

8. A method in accordance with claim 1, further including the step of controlling appearance of a local display on the local computer by the remote data recovery computer.

9. A method in accordance with claim 1, further including the step of monitoring appearance of a local display on the local computer by a remote display on the remote data recovery computer.

10. A method in accordance with claim 1, further including the step of downloading a data recovery application program from the remote data recovery computer to the local computer.

11. A method in accordance with claim 1, further including the step of downloading a data recovery diagnostic program from the remote data recovery computer to the local computer.

12. A method in accordance with claim 11, wherein the step of downloading includes downloading a data recovery application program onto a storage medium at the local computer.

13. A method in accordance with claim 1, further including the step of executing a data recovery application program at the local computer.

14. A method in accordance with claim 1, further including the step of executing a data recovery diagnostic program at the local computer.

15. A method in accordance with claim 1, further including the step of downloading data to be recovered from the local computer to the remote data recovery computer.

16. A method in accordance with claim 1, further including the steps of downloading a data recovery application program from the remote data recovery computer to the local computer and executing the data recovery application program.

17. A method in accordance with claim 1, wherein the step of establishing communications establishes communications through a communications server, and further including the step of establishing communications between a second remote data recovery computer and a second local computer through the communications server for data recovery.

18. A method in accordance with claim 1, including the step of deferring changes in data to the local computer until such time as an operator of the remote data recovery computer makes the decision to continue or; alternatively, abandon the changes in data.

19. A method in accordance with claim 18, further including the step of wherein if a decision is made to commit the changes in data to the local computer, then all data which is marked for being changed is first transferred to an archival facility at the remote data recovery computer for archival.

20. A method in accordance with claim 19, including the step of logging all write activity, to be performed on a sector of a local storage device of the local computer, to a file at the remote data recovery computer.

21. A method in accordance with claim 20, further including the step of providing each entry within the file with an identifier which identifies the sector and local storage device, as well as the latest data which was written to that sector.

22. A data recovery system for recovering inaccessible data from a data storage medium, comprising:
   a local computer associated with the data storage medium, the local computer having a central processor unit, memory, a removable media storage device and a normal operating system;
   a remote data recovery computer;
   a removable data storage medium to be loaded into the removable media storage device of the local computer the removable data storage medium comprising bootable data recovery program means pre-recorded thereon; and
   bootable remote data recovery program means to be loaded into the memory of the local computer for operating the local computer independently of the normal operating system and to establish communications between the local computer and the remote data recovery computer;
   wherein the local computer is remotely controlled by the remote data recovery computer so that data on the data storage medium of the local computer can be diagnosed and rectified.

23. A data recovery system in accordance with claim 22, wherein the bootable remote data recovery program means comprises bootable operating system means for operating the local computer.

24. A data recovery system in accordance with claim 22, wherein the bootable remote data recovery program means comprises data recovery diagnostic program means.

25. A data recovery system in accordance with claim 22, wherein the bootable remote data recovery program means comprises data recovery application program means.

26. A data recovery system in accordance with claim 22, wherein the remote data recovery computer comprises a second data storage medium for storing data recovery application program means, said data recovery application program means being downloadable from the remote data recovery computer to the local computer.

27. A data recovery system in accordance with claim 22, further comprising a communications channel over which communications are established between the local computer and the remote data recovery computer, the communications channel using one of the group consisting of a telephone line, a local area network, a wide area network and Internet.

28. A data recovery system in accordance with claim 22, wherein the remote data recovery computer comprises a display for monitoring data recovery application programs at the local computer.

29. A data recovery system in accordance with claim 22, wherein the bootable remote data recovery program means comprises a program for querying a user of the local computer for user information.

30. A data recovery system in accordance with claim 22, wherein the bootable remote data recovery program means comprises a program for querying a user of the local computer for data recovery information.

31. A data recovery system in accordance with claim 22, wherein the bootable remote data recovery program means is operable from the remote data recovery computer so as to recover data from the data storage medium.

32. A data recovery system in accordance with claim 22, wherein the bootable remote data recovery program means is operable from the remote data recovery computer so as to diagnose a data recovery situation on the data storage medium.

33. A data recovery system in accordance with claim 22, wherein the bootable remote data recovery program means is operable from the remote data recovery computer so as to download data to be recovered to the remote data recovery computer.

34. A method for remotely recovering data from a storage medium of a local computer, the method comprising the steps of:
   loading into a removable media storage device of the local computer a removable storage medium including a remote data recovery application program pre-recorded thereon;
   loading the remote data recovery application program from the removable storage medium into memory of the local computer;
   establishing communications between the local computer and a remote data recovery computer through operation of the remote data recovery application program by the local computer; and
   remotely controlling the local computer by the remote data recovery computer, whereupon data on the storage medium of the local computer can be diagnosed and rectified through operation of the remote data recovery computer.

35. A method in accordance with claim 34, further comprising the step of displaying selected data recovery information on a local display associated with the local computer.

36. A data recovery system for recovering inaccessible data from a data storage medium, comprising:
   a local computer associated with the data storage medium, the local computer having memory and a removable media storage device;
   a remote data recovery computer;
   a removable data storage medium to be loaded into the removable media storage device of the local computer the removable data storage medium comprising remote data recovery program means pre-recorded thereon; and
   the remote data recovery program means to be loaded into the memory of the local computer to establish communications between the local computer and the remote data recovery computer;
   wherein the remote data recovery program means permits the local computer to be remotely controlled by the remote data recovery computer for diagnosing and rectifying data on the data storage medium.

37. A data recovery system in accordance with claim 36, including means for deferring all changes in data to the local computer until such time as an operator of the remote data recovery computer makes the decision to continue or, alternatively, abandon the changes in data.

38. A data recovery system in accordance with claim 37, wherein if a decision is made to commit the changes in data to the local computer, including means for transferring all data which is marked for being changed to an archival facility at the remote data recovery computer for archival before making the changes at the local computer.

39. A data recovery system in accordance with claim 38, including means for logging all write activity, to be performed on a sector of a local storage device of the local computer, to a file at the remote data recovery computer.

40. A data recovery system in accordance with claim 39, wherein each entry within the file contains an identifier which identifies the sector and local storage device, as well as the latest data which was written to that sector.

41. A data recovery system in accordance with claim 36, including means selected data recovery events during a data recovery process.

42. A method for remotely recovering data from a local computer having a normal operating system, the method comprising the steps of:

loading into memory of the local computer, a bootable remote data recovery operating program from a storage medium, the bootable remote data recovery operating program being operated locally by the local computer and independently of the normal operating system;

establishing communications between the local computer and a remote data recovery computer through operation of the remote data recovery operating program by the local computer;

remotely controlling the local computer by the remote data recovery computer, whereupon data recovery can be performed through operation of the remote data recovery computer; and downloading a data recovery application program from the remote data recovery computer to the local computer.

43. A method in accordance with claim 42, including the step of deferring changes in data to the local computer until such time as an operator of the remote data recovery computer makes the decision to continue or, alternatively, abandon the changes in data.

44. A method in accordance with claim 43, further including the step of wherein if a decision is made to commit the changes in data to the local computer, then all data which is marked for being changed is first transferred to an archival facility at the remote data recovery computer for archival.

45. A method in accordance with claim 44, including the step of logging all write activity, to be performed on a sector of a local storage device of the local computer, to a file at the remote data recovery computer.

46. A method in accordance with claim 45, further including the step of providing each entry within the file with an identifier which identifies the sector and local storage device, as well as the latest data which was written to that sector.

47. A method in accordance with claim 42, further including the step of monitoring operation of data recovery programs executing on the local computer via a display at the remote data recovery computer.

48. A method in accordance with claim 47, wherein the step of monitoring includes monitoring the storage medium containing the remote data recovery operating program for data recovery application programs.

49. A method in accordance with claim 42, further including the step of controlling operation of data recovery programs executing on the local computer by a computer input device at the remote data recovery computer.

50. A method in accordance with claim 42, further including the step of controlling appearance of a local display on the local computer by the remote data recovery computer.

51. A method in accordance with claim 42, further including the step of monitoring appearance of a local display on the local computer by a remote display on the remote data recovery computer.

52. A method in accordance with claim 42, further including the step of downloading a data recovery diagnostic program from the remote data recovery computer to the local computer.

53. A method in accordance with claim 52, wherein the step of downloading includes downloading a data recovery application program onto a storage medium at the local computer.

54. A method in accordance with claim 42, further including the step of executing a data recovery application program at the local computer.

55. A method in accordance with claim 42, further including the step of executing a data recovery diagnostic program at the local computer.

56. A method in accordance with claim 42, further including the step of downloading data to be recovered from the local computer to the remote data recovery computer.

57. A method in accordance with claim 42, further including the steps of downloading a data recovery application program from the remote data recovery computer to the local computer and executing the data recovery application program.

58. A method in accordance with claim 42, wherein the step of establishing communications establishes communications through a communications server, and further including the step of establishing communications between a second remote data recovery computer and a second local computer through the communications server for data recovery.

59. A data recovery system for recovering inaccessible data from a data storage medium, comprising:

a local computer associated with the data storage medium, the local computer having memory;

a remote data recovery computer; and remote data recovery program means to be loaded into the memory of the local computer to establish communications between the local computer and the remote data recovery computer;

wherein the remote data recovery program means permits the local computer to be remotely controlled by the remote data recovery computer for recovery of data from the data storage medium; and downloading a data recovery application program from the remote data recovery computer to the local computer.

60. A data recovery system in accordance with claim 59, including means for deferring all changes in data to the local computer until such time as an operator of the remote data recovery computer makes the decision to continue or, alternatively, abandon the changes in data.

61. A data recovery system in accordance with claim 60, wherein if a decision is made to commit the changes in data to the local computer, including means for transferring all data which is marked for being changed to an archival facility at the remote data recovery computer for archival before making the changes at the local computer.

62. A data recovery system in accordance with claim 61, including means for logging all write activity, to be performed on a sector of a local storage device of the local computer, to a file at the remote data recovery computer.

63. A data recovery system in accordance with claim 62, wherein each entry within the file contains an identifier which identifies the sector and local storage device, as well as the latest data which was written to that sector.

64. A data recovery system in accordance with claim 59, including means selected data recovery events during a data recovery process.

65. A method in accordance with claim 48, further including the step of querying a local computer user for information through operation of the remote data recovery operating program by the local computer prior to establishing communication with the remote data recovery computer.

66. A method in accordance with claim 65, further including the step of querying the local computer user for data recovery information through operation of the remote data recovery operating program by the local computer prior to establishing communication with the remote data recovery computer.

67. A method in accordance with claim 65, further including the step of querying the local computer user for user identifying information through operation of the remote data recovery operating program by the local computer prior to establishing communication with the remote data recovery computer.

68. A method of data recovery comprising the steps of:
   establishing a communications link between a local computer having a data storage device requiring recovery of data and a remote data recovery computer;
   enabling interaction between the local computer and the remote data recovery computer;
   maintaining access to data recovery programs resident at the remote data recovery computer;
   diagnosing the data storage device;
   downloading a data recovery application program from the remote data recovery computer to the local computer; and
   recovering data on the data storage device of the local computer.

69. The method of claim 68, wherein the step of establishing a communications link comprises establishing a communications link over one of the group consisting of a modem, a local area network, a wide area network and Internet.

70. A method for remotely recovering data from a local computer, the method comprising the steps of:
   loading a remote data recovery application program from a storage medium into memory of the local computer
   establishing communications between the local computer and a remote data recovery computer through operation of the remote data recovery application program by the local computer;
   downloading a data recovery application program from the remote data recovery computer to the local computer; and
   remotely controlling the local computer by the remote data recovery computer, whereupon data recovery can be performed through operation of the remote data recovery computer.

71. A method in accordance with claim 70, further comprising the step of displaying selected data recovery information on a local display associated with the local computer.

* * * * *

UNITED STATES PATENT AND TRADEMARK OFFICE
CERTIFICATE OF CORRECTION

PATENT NO.   : 6,145,088
DATED        : November 7, 2000
INVENTOR(S)  : Stevens

Page 1 of 5

It is certified that error appears in the above-identified patent and that said Letters Patent is hereby corrected as shown below:

Front Page [56] References Cited, OTHER PUBLICATIONS, please add the following documents:

"Network Management", LAN TIMES 1995-96 Buyers Directory Issue, Sept. 18, 1995, pp. 250-276

"Remote Access Hardware & Software", LAN TIMES 1995-96 Buyers Directory Issue, Sept. 18, 1995, pp. 326-343

"Support Services", LAN TIMES 1995-96 Buyers Directory Issue, Sept. 18, 1995, pp. 433-438

"PC-Technician™ Product Information", Windsor Technologies Internet Website printout (7 pgs.), 10/29/96

"PC-Diagnosys™ Product Information", Windsor Technologies Internet Website printout (6 pgs.), 10/29/96

"PC Diagnostics that Really Finds the Bugs", 2-pg. CommTech Products information sheet "DR. TECH", Dr. Tech by Dominion Research Technologies 2-pg. Dr. Tech Selfboot/ DOS product information "Operating System Independent Diagnostic Utility", QuickTech Internet Website Printout (2 pgs.), 10/29/96

UNITED STATES PATENT AND TRADEMARK OFFICE
CERTIFICATE OF CORRECTION

PATENT NO.    : 6,145,088                     Page 2 of 5
DATED         : November 7, 2000
INVENTOR(S)   : Stevens It is certified that error appears in the above-identified patent and that said Letters Patent is hereby corrected as shown below:

"Professional Core-Level Analysis, Testing, and troubleshooting PC Software for IBM Compatible PC, XT, AT, 286, 386, 486 and Pentium Systems", QuickTech Internet Website printout (2 pgs.), 10/29/96

"PC Clinic Remote Diagnostic OEM Program & Prices", Data Depot Internet Website printout (6 pgs.), 10/29/96

"PC Clinic Self-Boot/DOS/Remote Diagnostic Kit", Data Depot Internet Website printout (6 pgs.), 10/29/96

"AMIDiag 5.0", American Megatrends Internet Website printout (5 pgs.), 10/29/96

"PC Care 95", American Megatrends Internet Website printout (6 pgs.), 10/29/96

"System Requirements/Screen Shots/Where to Buy/FAQ's/Reviews", CHECKIT Internet Website printout (2 pgs.), 10/29/96

"CardSoft™ Product Brief", SystemSoft Internet Website printout (5 pgs.), 10/28/96

SystemWizard™ Server", SystemSoft Internet Website printout (3 pgs.), 10/28/96

SystemWizard™ Client", SystemSoft Internet Website printout (3 pgs.), 10/28/96

SystemWizard™ Product Overview", SystemSoft Internet Website printout (6 pgs.), 10/28/96

UNITED STATES PATENT AND TRADEMARK OFFICE
CERTIFICATE OF CORRECTION

PATENT NO. : 6,145,088
DATED : November 7, 2000
INVENTOR(S) : Stevens

It is certified that error appears in the above-identified patent and that said Letters Patent is hereby corrected as shown below:

DiagSoft Company Profile, DiagSoft Internet Website printout (3 pgs.), 10/28/96

DiagSoft Products & Services, DiagSoft Internet Website printout (5 pgs.), 10/28/96

DiagSoft press Releases of March 14, 1996, March 16, 1996 and April 1, 1996, DiagSoft Internet Website printout (3 pgs.), 10/28/96

"QAPlus®/WIN-WIN", DiagSoft Internet Website printout (3 pgs.), 10/28/96

"Professional QAPlus® Datasheet", DiagSoft Internet Website printout (5 pgs.), 10/28/96

"Peace of Mind Datasheet", DiagSoft Internet Website printout (3 pgs.), 10/28/96

"QAPlus®/FE Datasheet", DiagSoft Internet Website printout (5 pgs.), 10/28/96

"QAPlus®/2 Datasheet", DiagSoft Internet Website printout (3 pgs.), 10/28/96

"QAPlus®/Factory Datasheet", DiagSoft Internet Website printout (4 pgs.), 10/28/96

"QAPlus®/PRO Datasheet", DiagSoft Internet Website printout (5 pgs.), 10/28/96

UNITED STATES PATENT AND TRADEMARK OFFICE
CERTIFICATE OF CORRECTION

PATENT NO. : 6,145,088
DATED : November 7, 2000
INVENTOR(S) : Stevens

It is certified that error appears in the above-identified patent and that said Letters Patent is hereby corrected as shown below:

"Diagnostic Utilities", PC Magazine Online May 14, 1996 article, PC Magazine Internet Website printout (2 pgs.), 10/29/96

"DiagSoft Inc.: QAPlus/Win-Win", PC Magazine Online May 14, 1996 article, PC Magazine Internet Website printout (1 pg.), 10/29/96

"PCLabs Online", PC Magazine Online, PC Magazine Internet Website printout (2 pgs.), 10.29/96

"Touchstone Software Corp.: WinCheckIt", PC Magazine Online May 14, 1996 article, PC Magazine Internet Website printout (1 pg.), 10/29/96

"Cybermedia Inc.: First Aid 95", PC Magazine Online May 14, 1996 article, PC Magazine Internet Website printout (1 pg.), 10/29/96

UNITED STATES PATENT AND TRADEMARK OFFICE
CERTIFICATE OF CORRECTION

PATENT NO.      : 6,145,088
DATED           : November 7, 2000
INVENTOR(S)     : Stevens It is certified that error appears in the above-identified patent and that said Letters Patent is hereby corrected as shown below:

"Quarterdeck Software Corp.: WINProbe 4", PC Magazine Online May 14, 1996 article, PC Magazine Internet Website printout (1 pg.), 10/29/96

"American Megatrends Inc.: PC Care 95", PC Magazine Online May 14, 1996 article, PC Magazine Internet Website printout (1 pg.), 10/29/96

Burkes, et al., "Design Approaches for Real-Time Transaction Processing Remote Site Recovery", *IEEE Publications Ondisc*, pp. 568-572 (May 1990)--

Signed and Sealed this

Nineteenth Day of June, 2001

*Attest:*

*Attesting Officer*

NICHOLAS P. GODICI
*Acting Director of the United States Patent and Trademark Office*